(12) United States Patent
Katsube et al.

(10) Patent No.: US 7,454,780 B2
(45) Date of Patent: Nov. 18, 2008

(54) SERVICE PROVIDING SYSTEM AND METHOD

(75) Inventors: Tomohiro Katsube, Chiba (JP); Atsushi Fuse, Tokyo (JP); Masato Yokobori, Chiba (JP); Takamasa Iwade, Tokyo (JP); Naoshi Suzuki, Chiba (JP); Keiji Yuzawa, Saitama (JP); Junichi Ootani, Tokyo (JP); Takafumi Masuda, Kanagawa (JP); Hiroshi Iwasaki, Chiba (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 10/484,201

(22) PCT Filed: May 19, 2003

(86) PCT No.: PCT/JP03/06180

§ 371 (c)(1),
(2), (4) Date: Jan. 24, 2005

(87) PCT Pub. No.: WO03/098455

PCT Pub. Date: Nov. 27, 2003

(65) Prior Publication Data

US 2005/0132189 A1 Jun. 16, 2005

(30) Foreign Application Priority Data

May 20, 2002 (JP) ............... 2002-144896

(51) Int. Cl.
*G06F 21/00* (2006.01)
*G06F 15/16* (2006.01)

(52) U.S. Cl. ................................. 726/3; 726/27

(58) Field of Classification Search ............... None
See application file for complete search history.

(56) References Cited

U.S. PATENT DOCUMENTS 5,706,427 A    1/1998   Tabuki (Continued)

FOREIGN PATENT DOCUMENTS

EP           1186984 A2      3/2002

(Continued)

OTHER PUBLICATIONS

Office action for JP Application No. 2002-144896 dated Mar. 20, 2007.

*Primary Examiner*—Christopher A Revak
(74) *Attorney, Agent, or Firm*—Sonnenschein Nath & Rosenthal LLP

(57) ABSTRACT

This invention relates to a service providing system and a service providing method for allowing users to receive a service from a service server without having to submit their security-critical information to that server. A CE device 1 requests provision of the service by transmitting authentication information such as a device ID to a surrogate authentication server 2. The surrogate authentication server 2 authenticates the CE device 1 based on the authentication information and transmits a result of the authentication to the service server 3. In turn, the service server 3 provides the CE device 1 with the requested service based on the result of the authentication received from the surrogate authentication server 2. The CE device 1 then uses the service provided by the service server 3. This system can be applied advantageously to network-based marketing systems.

11 Claims, 25 Drawing Sheets

U.S. PATENT DOCUMENTS

| | | | |
|---|---|---|---|
| 5,841,970 A | 11/1998 | Tabuki | |
| 5,987,232 A | 11/1999 | Tabuki | |
| 6,324,648 B1* | 11/2001 | Grantges, Jr. | 726/12 |
| 6,351,812 B1* | 2/2002 | Datar et al. | 713/182 |
| 6,826,696 B1* | 11/2004 | Chawla et al. | 726/4 |
| 7,137,006 B1* | 11/2006 | Grandcolas et al. | 713/180 |
| 7,278,165 B2* | 10/2007 | Molaro | 726/27 |
| 2002/0049912 A1 | 4/2002 | Honjo | |
| 2002/0103765 A1* | 8/2002 | Ohmori | 705/67 |
| 2003/0014519 A1* | 1/2003 | Bowers et al. | 709/225 |
| 2003/0083986 A1 | 5/2003 | Kobayashi | |
| 2003/0149781 A1* | 8/2003 | Yared et al. | 709/229 |
| 2005/0020354 A1* | 1/2005 | Nguyen et al. | 463/25 |
| 2005/0154913 A1* | 7/2005 | Barriga et al. | 713/201 |
| 2005/0192099 A1* | 9/2005 | Nguyen et al. | 463/42 |
| 2005/0204041 A1* | 9/2005 | Blinn et al. | 709/225 |
| 2005/0228981 A1* | 10/2005 | Gavrilov et al. | 713/100 |
| 2006/0195914 A1* | 8/2006 | Schwartz et al. | 726/32 |
| 2008/0046983 A1* | 2/2008 | Lester et al. | 726/5 |

FOREIGN PATENT DOCUMENTS

| | | |
|---|---|---|
| EP | 1244263 A2 | 9/2002 |
| JP | 09-81518 | 3/1997 |
| JP | 09-081519 | 3/1997 |
| JP | 09-81519 | 3/1997 |
| JP | 09-81520 | 3/1997 |
| JP | 10-269184 | 10/1998 |
| JP | 11-181804 | 10/1999 |
| JP | 2001-244927 | 9/2001 |
| JP | 2001-344205 | 12/2001 |
| JP | 2001344205 | 12/2001 |
| JP | 2002-63524 | 2/2002 |
| JP | 2002-82911 | 2/2002 |
| JP | 2002-73556 | 3/2002 |
| JP | 2002-82911 | 3/2002 |
| JP | 2002116977 | 4/2002 |
| JP | 2002-132730 | 5/2002 |
| JP | 3361661 | 10/2002 |

* cited by examiner

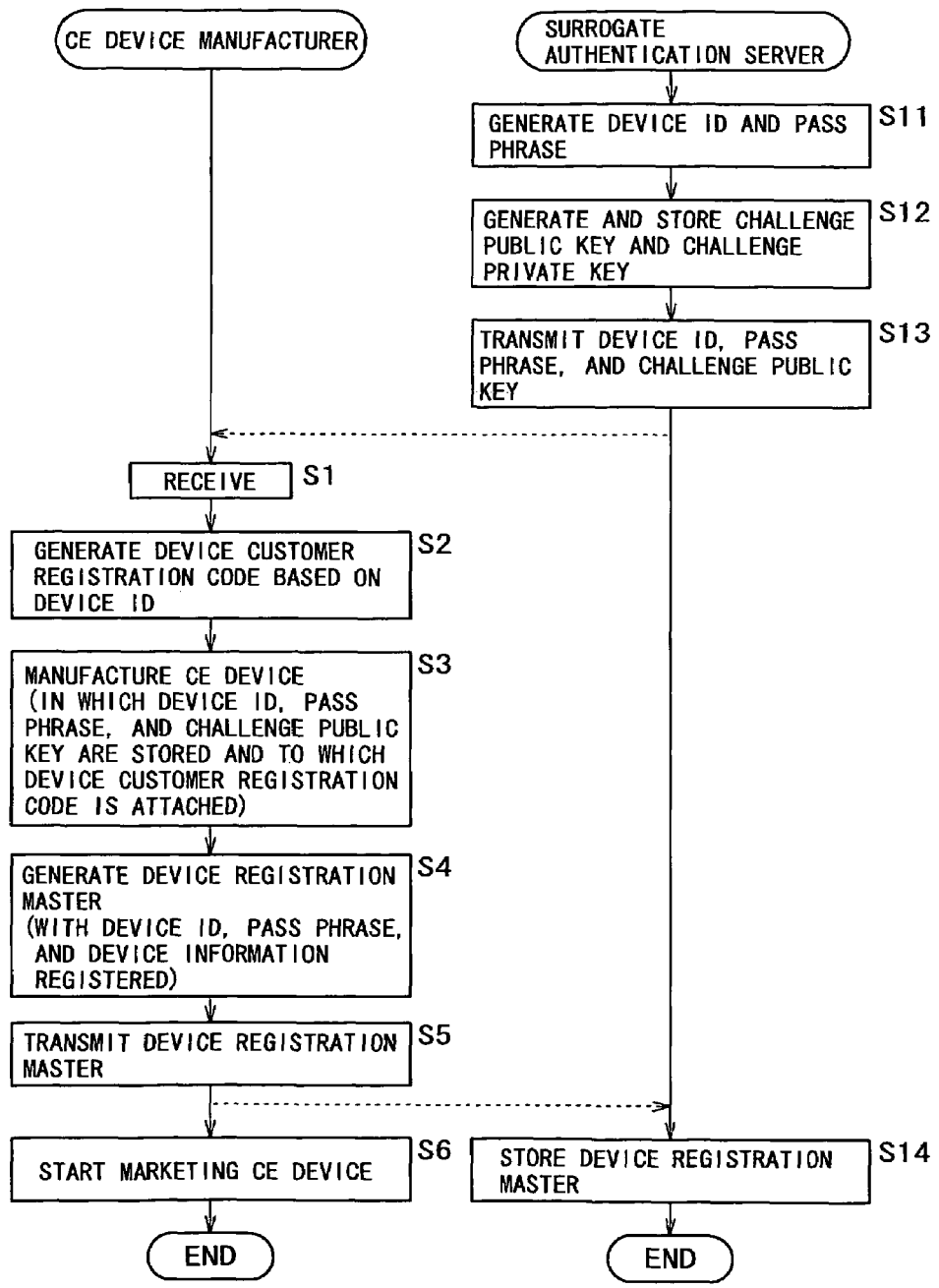

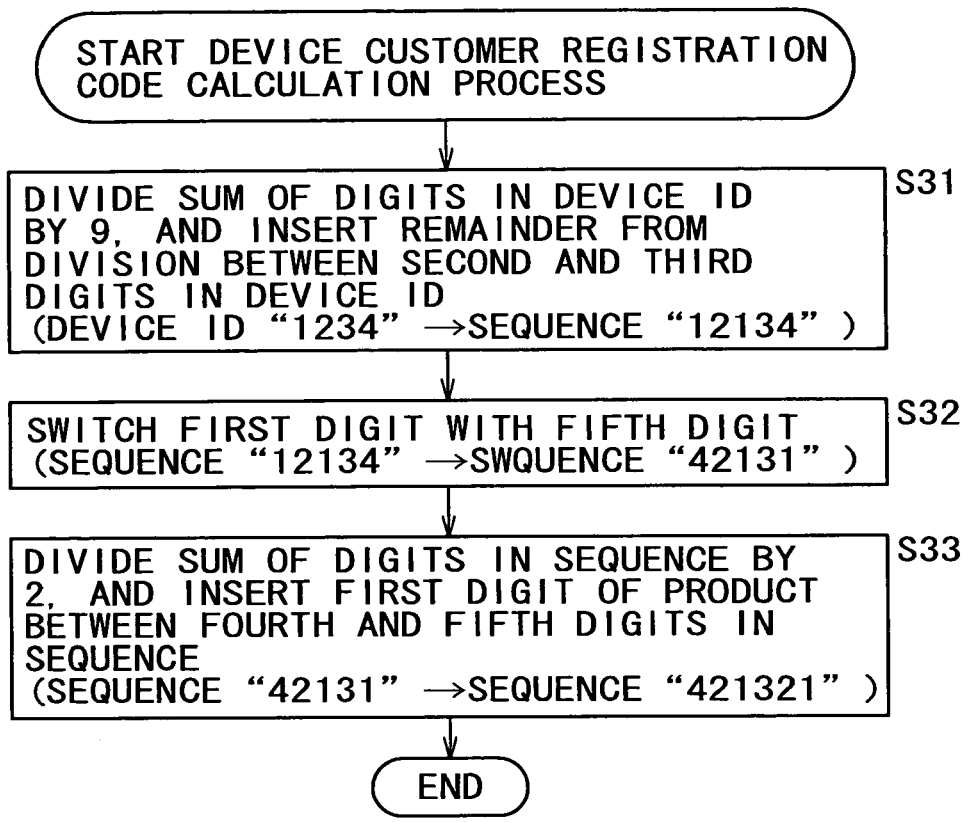

FIG. 8

```
INPUT USER INFORMATION FOR
REGISTRATION WITH THE SURROGATE
AUTHENTICATION SERVER

DEVICE ID: XXXX

NAME      : [        ]
ADDRESS   : [               ]
TELEPHONE : [          ]
     ⋮

```
DEVICE ID: XXXX

USER INFORMATION:

NAME      : XXXX
   ADDRESS   : XXXX
   TELEPHONE : XXXX
       ⋮

( ENTER )  ―― 27B
```

F I G. 1 0

YOUR REGISTRATION WITH
THE SURROGATE AUTHENTICATION
SERVICE HAS BEEN COMPLETED

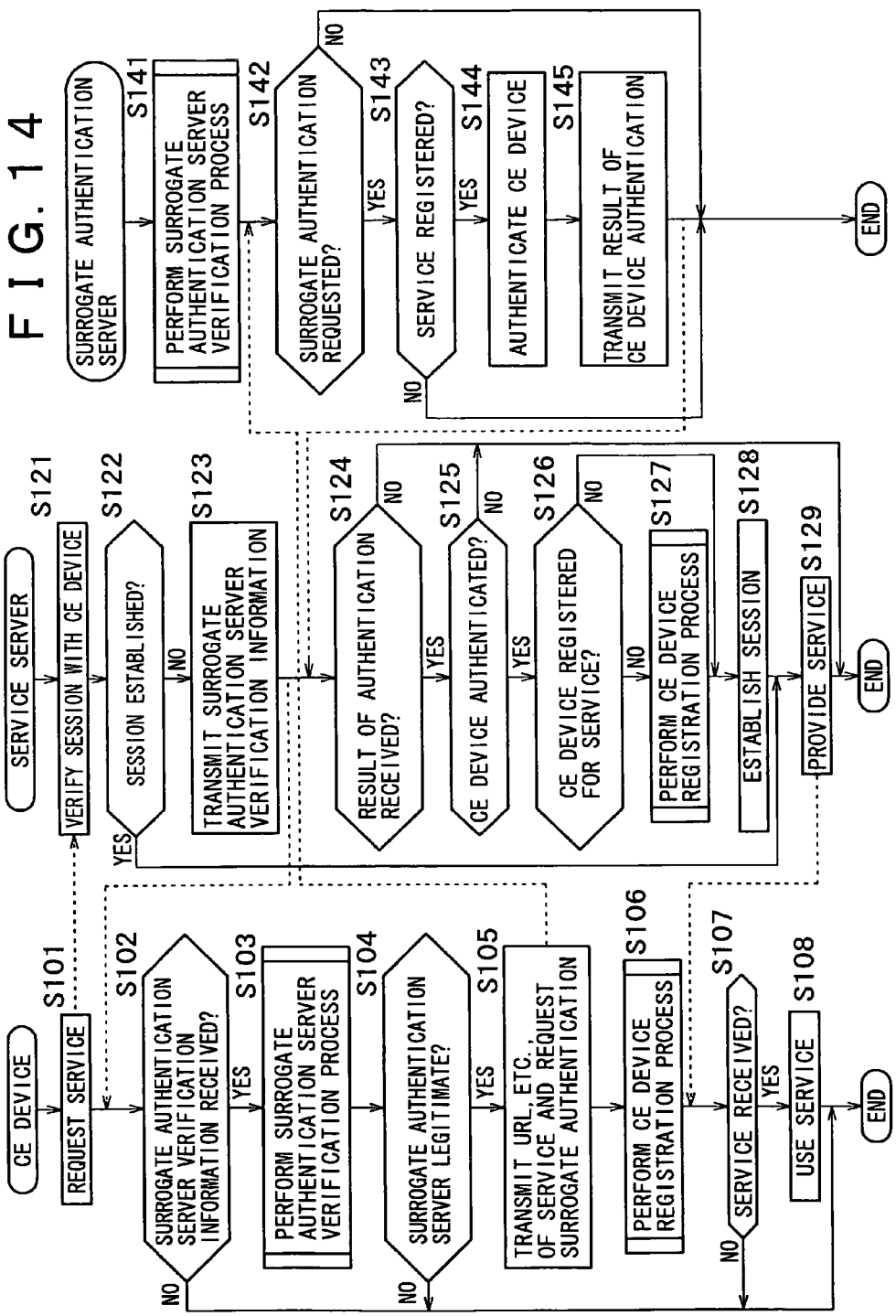

FIG. 15

```
<EMBED TYPE= "application/x-zzny-machine-authenticate"
HIDDEN= "true" HEIGHT=0 WIDTH=0
CHALLENGE_URL= "https://foo/challenge"  ──3A-1
AUTHENTICATE_URL= "https://foo/authenticate" ──3A-2
ERROR_URL= "https://foo/error/html" >
                    )
                  3A-3
```

FIG. 16

```
X-Zzny-Device-ChallengeService: urn:Uncuor#challenge  ──3B-1
X-Zzny-Device-AuthService: urn:Uncuor#authenticateDeviceID
X-Zzny-Device-ErrorURL:http://jigyotai.com/error.html
                                                    ──3B-2
                                              3B-3
```

FIG. 22

```
INPUT USER INFORMATION FOR
REGISTRATION WITH THE SERVICE

DEVICE ID:XXXX

NAME      :[        ]
ADDRESS   :[              ]
TELEPHONE :[        ]
              ⋮
                              ( OK )──27D
```

FIG. 23

```
DEVICE ID:XXXX

USER INFORMATION:

NAME      :XXXX
  ADDRESS   :XXXX
  TELEPHONE :XXXX
              ⋮
                            (ENTER)──27E
```

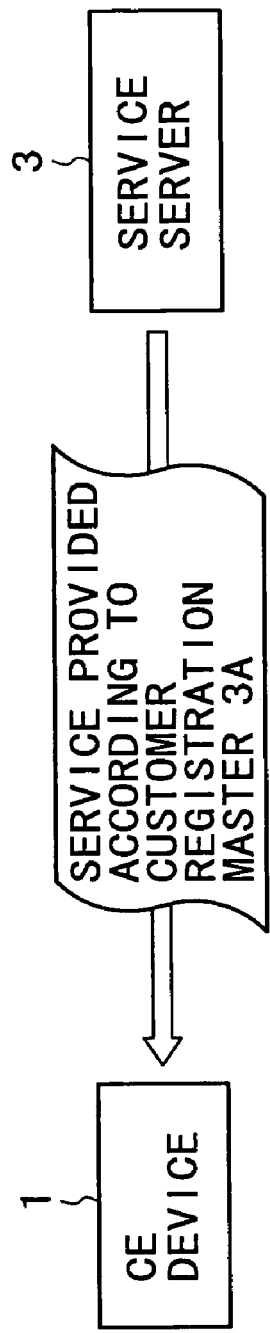
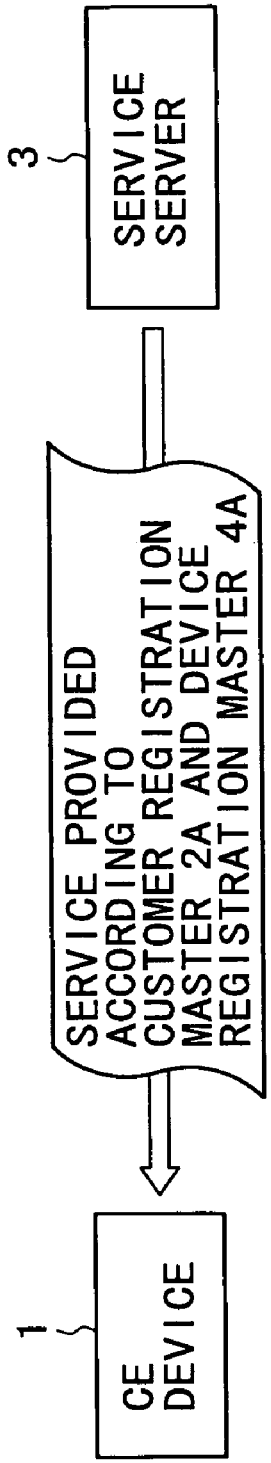
FIG. 25A
FIG. 25B

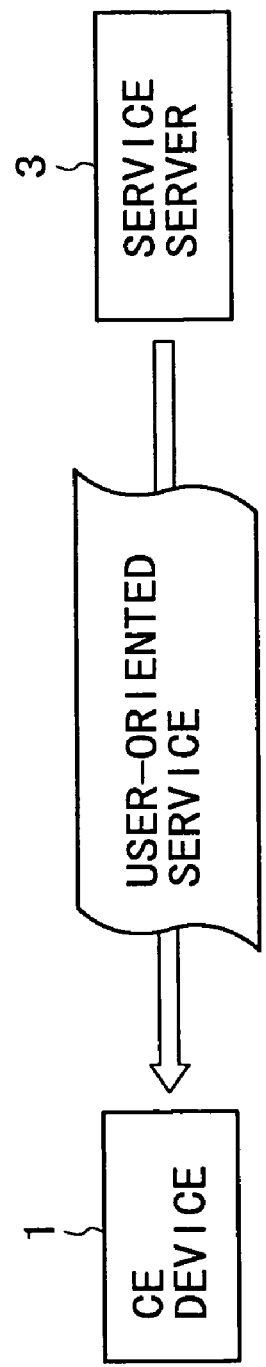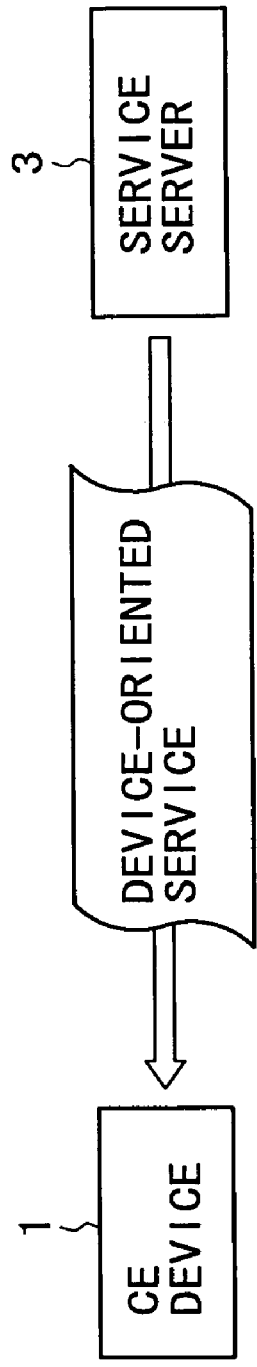

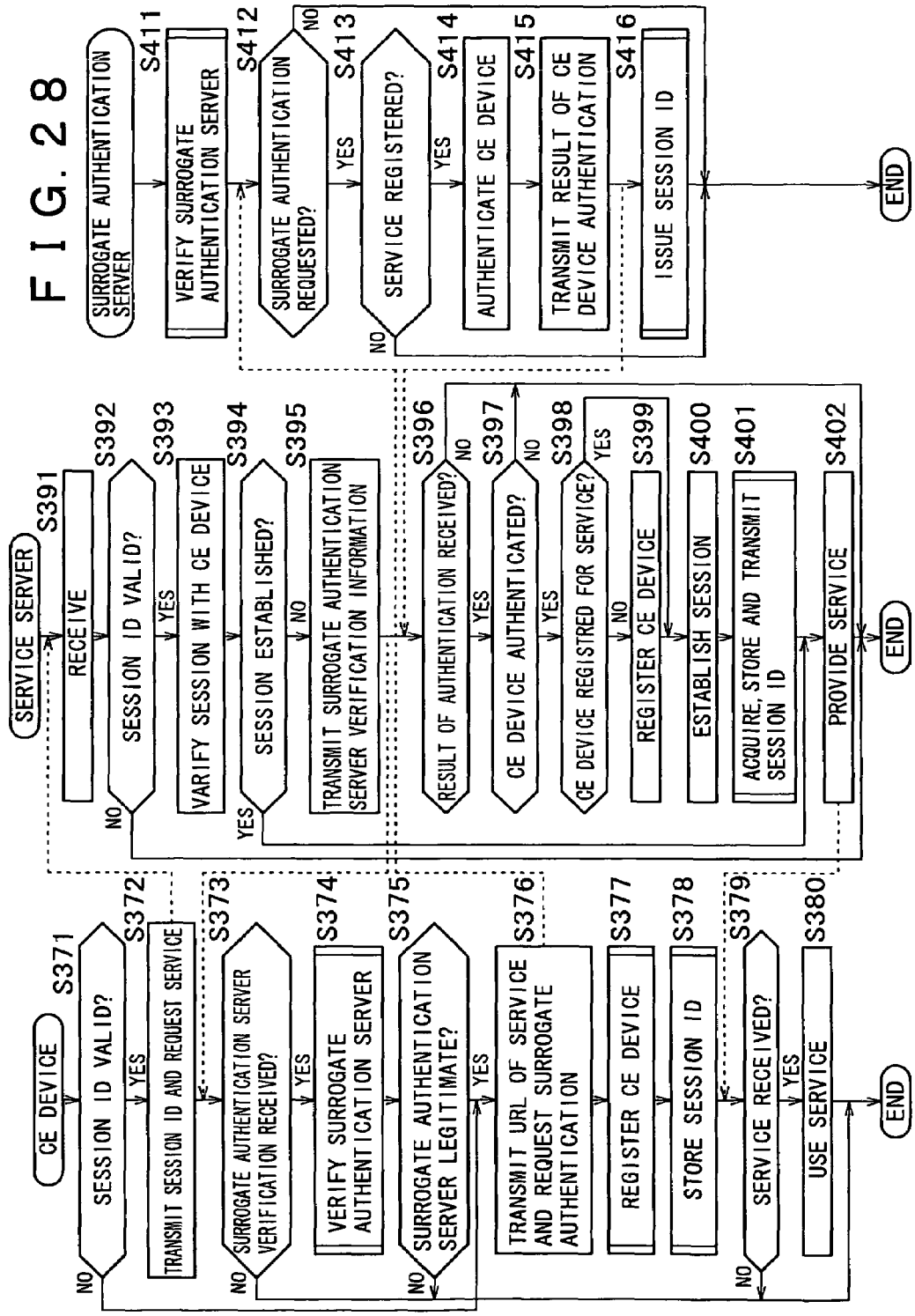

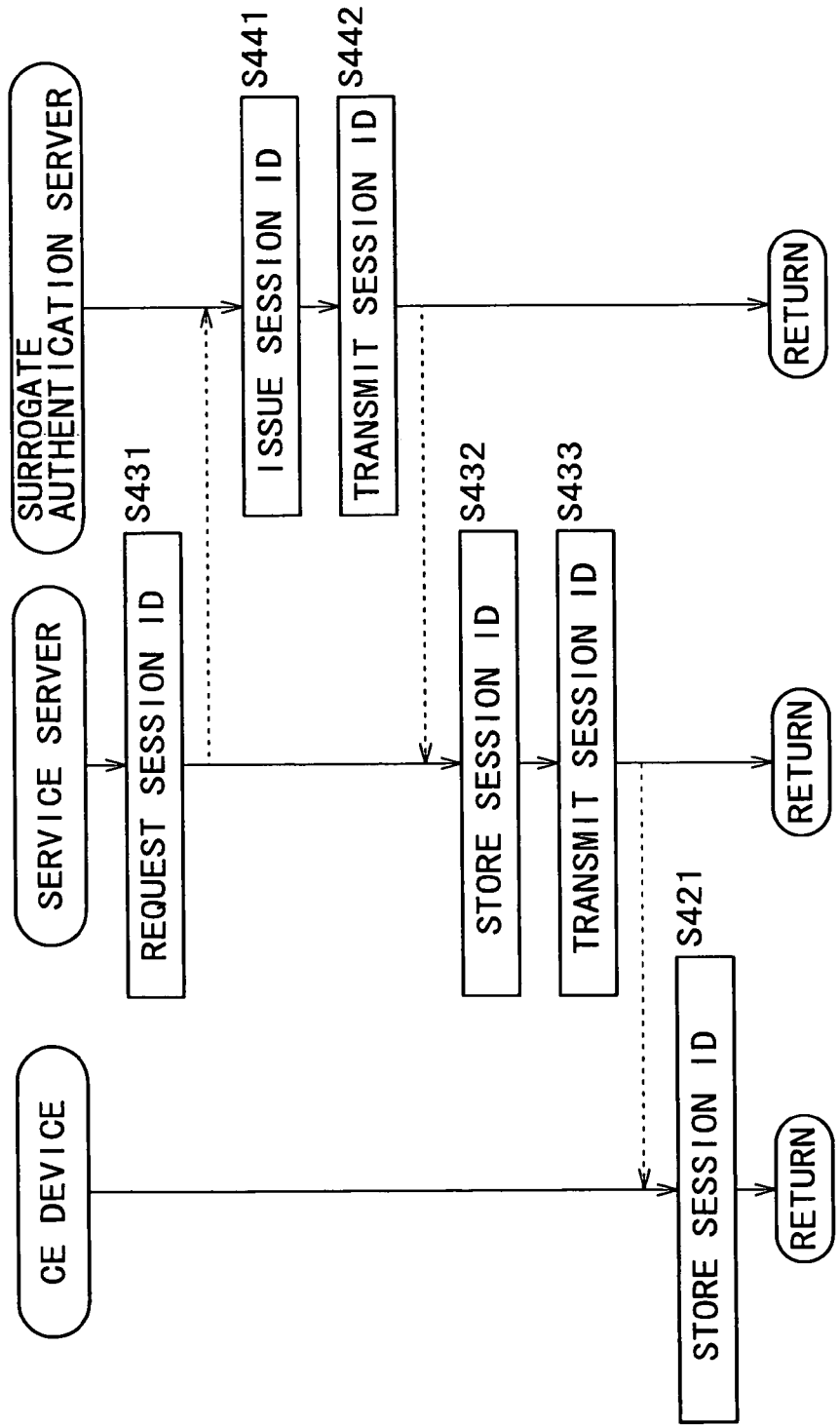

SERVICE PROVIDING SYSTEM AND METHOD

BACKGROUND OF THE INVENTION

The present invention relates to a service providing system and a service providing method. More particularly, the invention relates to a service providing system and a service providing method for allowing users to receive services from a service server without submitting their security-critical information to that server.

When receiving services from a service server over a network, users are required conventionally to submit their security-critical information such as device IDs to that service server for user authentication purposes.

However, many service servers are run by individuals, some of whom have been unscrupulous enough to abuse the device IDs or user IDs submitted by the recipients of their service offerings.

SUMMARY OF THE INVENTION

The present invention has been made in view of the above circumstances and provides a system and a method for allowing users to receive services from a service server over a network without having to submit their security-critical information such as device IDs to that server.

In carrying out the invention and according to one aspect thereof, there is provided a first service providing system comprising a terminal, a service providing apparatus, and an authentication apparatus; wherein the terminal includes: a first transmitting element for transmitting authentication information to the authentication apparatus; and a using element for using a service provided by the service providing apparatus; wherein the authentication apparatus includes: an authenticating element for authenticating the terminal based on the authentication information transmitted from the first transmitting element of the terminal; and a second transmitting element for transmitting a result of the authentication performed by the authenticating element to the service providing apparatus; and wherein the service providing apparatus includes a providing element for providing the service to the terminal depending on the result of the authentication transmitted from the second transmitting element of the authentication apparatus.

In one preferred structure according to the invention, the service providing apparatus may include a third transmitting element for transmitting authentication request information to the terminal, and the first transmitting element of the terminal may transmit the authentication information to the authentication apparatus when the authentication request information is transmitted from the third transmitting element of the service providing apparatus.

In another preferred structure according to the invention, the authentication request information may include a URL of a website run by the authentication apparatus for purposes of said authentication.

In a further preferred structure according to the invention, the first transmitting element of the terminal may transmit first identification information for identifying the service providing apparatus to the authentication apparatus together with the authentication information; the authentication apparatus may include a verifying element for verifying whether the service providing apparatus identified by the first identification information is legitimate; and the second transmitting element may transmit the result of the authentication to the service providing apparatus in accordance with a result of the verification performed by the verifying element.

In an even further preferred structure according to the invention, the authentication apparatus may include: a registering element for registering information about the terminal; and a first issuing element which, if the terminal is authenticated by the authenticating element as a legitimate terminal to receive the service, then issues second identification information for temporarily identifying the terminal; the service providing apparatus may include an acquiring element which, based on the second identification information, acquires the information about the terminal registered by the registering element of the authentication apparatus; and, based on the result of the authentication, the providing element may provide the service to the terminal in accordance with the information about the terminal acquired by the acquiring element.

In a still further preferred structure according to the invention, the first issuing element of the authentication apparatus may cancel the second identification information when the information about the terminal is acquired by the acquiring element of the service providing apparatus.

In a yet further preferred structure according to the invention, the authentication apparatus may include a second issuing element for issuing permission information for permitting the service providing apparatus to provide the service to the terminal; and, if the issued permission information permits the service providing apparatus to provide the service to the terminal, then the providing element of the service providing apparatus may provide the service to the terminal based on the result of the authentication.

In the first service providing system of this invention outlined above, the terminal transmits authentication information to the authentication apparatus. Uses the service provided by the service providing apparatus. The authentication apparatus authenticates the terminal based on the transmitted authentication information from the terminal, and transmits a result of the authentication to the service providing apparatus. In accordance with the result of the authentication sent from the authentication apparatus, the service providing apparatus provides the service to the terminal.

According to another aspect of the invention, there is provided a second service providing system comprising a terminal, a service providing apparatus, and an authentication apparatus; wherein the terminal includes: an authentication information transmitting element for transmitting authentication information to the authentication apparatus; and a first authentication result transmitting element for receiving a result of authentication from the authentication apparatus and transmitting the result of the authentication to the service providing apparatus; wherein the authentication apparatus includes: an authenticating element for performing the authentication based on the authentication information transmitted from the authentication information transmitting element of the terminal; and a second authentication result transmitting element for transmitting to the terminal the result of the authentication performed by the authenticating element; and wherein the service providing apparatus includes a third authentication result transmitting element for transmitting the result of the authentication to the authentication apparatus depending on the result of the authentication transmitted from the first authentication result transmitting element of the terminal.

In the second service providing system of this invention outlined above, the terminal transmits authentication information to the authentication apparatus, and receives a result of the authentication from the authentication apparatus. The result of the authentication is transmitted from the terminal to the service providing apparatus. The authentication apparatus performs the authentication based on the authentication information transmitted from the authentication information transmitting element of the terminal, and transmits the result of the authentication to the terminal. Depending on the transmitted result of the authentication, the service providing apparatus transmits the result of the authentication to the authentication apparatus.

According to a further aspect of the invention, there is provided a first service providing method for use with a terminal, a service providing apparatus, and an authentication apparatus, the first service providing method comprising the steps of: transmitting authentication information from the terminal to the authentication apparatus; authenticating the authentication information at the authentication apparatus; transmitting a result of the authentication of the authentication information to the terminal; transmitting the result of the authentication to the service providing apparatus; transmitting the result of the authentication from the service providing apparatus to the authentication apparatus; verifying whether the result of the authentication transmitted from the service providing apparatus is the same as the result of the authentication transmitted to the terminal; and providing a result of the verification to the service providing apparatus.

Where the first service providing method of this invention outlined above is in use, authentication information is transmitted from the terminal to the authentication apparatus. The authentication information is authenticated by the authentication apparatus, and a result of the authentication is transmitted from the authentication apparatus to the terminal. From the terminal, the result of the authentication is transmitted to the service providing apparatus. From the service providing apparatus, the result of the authentication is transmitted to the authentication apparatus. At the authentication apparatus, a check is made to determine whether the result of the authentication sent from the service providing apparatus is the same as the result of the authentication transmitted to the terminal. A result of the check is presented from the authentication apparatus to the service providing apparatus.

According to an even further aspect of the invention, there is provided a third service providing system comprising a terminal, a service providing apparatus, and an authentication apparatus; wherein the terminal includes: a service requesting element for requesting a service from the service providing apparatus; an authentication information transmitting element for transmitting authentication information to the authentication apparatus; an authentication result receiving element for receiving a result of authentication from the authentication apparatus; a first authentication result transmitting element for transmitting the result of the authentication to the service providing apparatus; and a using element for using the service provided by the service providing apparatus; wherein the authentication apparatus includes: an authentication information authenticating element for authenticating the terminal based on the authentication information transmitted from the authentication information transmitting element of the terminal; a second authentication result transmitting element for transmitting a result of the authentication performed by the authentication information authenticating element to the terminal; and an authentication result authenticating element for authenticating the result of the authentication transmitted from the service providing apparatus; and wherein the service providing apparatus includes a service providing element for providing the service to the terminal after transmitting to the authentication apparatus the result of the authentication transmitted from the first authentication result transmitting element of the terminal.

In the third service providing system of this invention outlined above, the terminal requests a service from the service providing apparatus, transmits authentication information to the authentication apparatus, receives a result of the authentication from the authentication apparatus, transmits the result of the authentication to the service providing apparatus, and uses the service provided by the service providing apparatus. Based on the transmitted authentication information from the terminal, the authentication apparatus authenticates the terminal, transmits the result of the authentication to the terminal, and authenticates the result of the authentication sent from the service providing apparatus. The service providing apparatus provides the service to the terminal after transmitting the result of the authentication from the terminal to the authentication apparatus.

According to a still further aspect of the invention, there is provided a second service providing method for use with a terminal, a service providing apparatus, and an authentication apparatus, the second service providing method comprising the steps of: requesting the service providing apparatus; transmitting authentication information from the terminal to the authentication apparatus; authenticating the authentication information at the authentication apparatus; transmitting a result of the authentication of the authentication information from the authentication apparatus to the terminal; transmitting the result of the authentication from the terminal to the service providing apparatus; transmitting the result of the authentication from the service providing apparatus to the authentication apparatus; verifying the result of the authentication transmitted from the service providing apparatus is the same as the result of the authentication transmitted to the terminal at the authentication apparatus; a result of the verification of the result of the authentication from the authentication apparatus to the service providing apparatus; and the requested service from the service providing apparatus to the terminal based on the result of the verification.

Where the second service providing method of this invention outlined above is in use, a service is requested from the service providing apparatus by the terminal. Authentication information is transmitted from the terminal to the authentication apparatus. The authentication information is authenticated by the authentication apparatus. A result of the authentication is transmitted from the authentication apparatus to the terminal. The result of the authentication is then transmitted from the terminal to the service providing apparatus. From the service providing apparatus, the result of the authentication is transmitted to the authentication apparatus. At the authentication apparatus, a check is made to determine whether the result of the authentication sent from the service providing apparatus is the same as the result of the authentication transmitted to the terminal. A result of the check is transmitted from the authentication apparatus to the service providing apparatus. Depending on the result of the check, the service providing apparatus provides the requested service to the terminal.

BRIEF DESCRIPTION OF DRAWINGS

FIG. 3 is a flowchart of steps constituting a process performed during manufacture of the CE device in FIG. 1;

FIG. 4 is a flowchart of steps constituting the process of generating a device customer registration code;

FIG. 5 is a tabular view listing device IDs and device customer registration codes;

FIG. 8 is a schematic view of a typical screen through which to input user information for authentication purposes;

FIG. 9 is a schematic view of a typical screen that permits verification of user information for authentication purposes;

FIG. 10 is a schematic view indicating a typical message display indicating the completion of registration;

FIG. 14 is a flowchart of steps in which the CE device shown in FIG. 1 receives a service from the service server;

FIG. 15 is a schematic view of an example of surrogate authentication server verification information;

FIG. 16 is a schematic view of another example of surrogate authentication server verification information;

FIG. 22 a schematic view of another typical screen through which to input user information for authentication purposes;

FIG. 23 is a schematic view of another typical screen that permits verification of user information for authentication purposes;

FIG. 25A is a schematic view illustrating a typical form in which the service server in FIG. 1 provides its service;

FIG. 25B is a schematic view sketching another typical form in which the service server in FIG. 1 provides its service;

FIG. 26A is a schematic view outlining another typical form in which the service server in FIG. 1 provides its service;

FIG. 26B is a schematic view presenting another typical form in which the service server in FIG. 1 provides its service;

FIG. 28 is a flowchart of other steps in which the CE device in FIG. 1 receives the service from the service server; and FIG. 29 is a flowchart of steps detailing a process carried out in steps S378, S401 and S416 of FIG. 28.

DETAILED DESCRIPTION OF THE PESENTLY PREFERRED EMBODIMENTS

Figure 1:
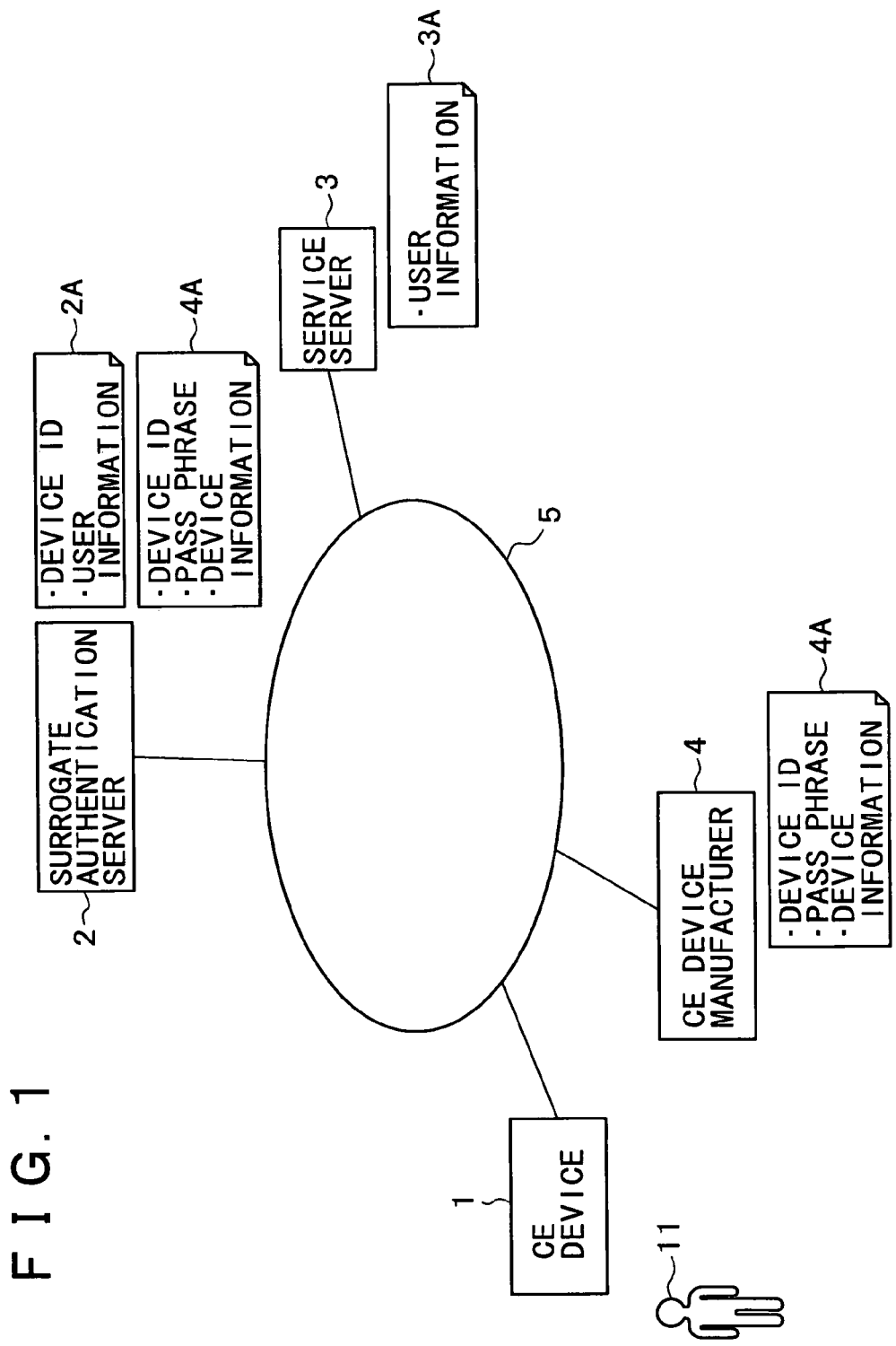
FIG. 1 is a schematic view showing a typical configuration of a service providing system embodying this invention.

FIG. 1 schematically shows a typical configuration of the service providing system embodying the invention. In this configuration, CE devices 1 and a CE device manufacturer 4 are connected to a network 5 including the Internet.

The CE (consumer electronics) device 1 may be any one of such consumer electronics products as personal computers, portable data terminals, TV sets, audio players, video cassette recorder, car navigation systems, microwave ovens, refrigerators, or washing machines. The device is assumed to be capable of connecting to the network 5.

The CE device 1 requests authentication from a surrogate authentication server 2 by transmitting information necessary for device authentication such as a device ID to that server 2. Following the successful authentication, the CE device 1 uses a service provided by a service server 3.

Based on the authentication information sent from the CE device 1, the surrogate authentication server 2 verifies on behalf of the service server 3 whether the CE device 1 in question is authorized illustratively to receive the service from the service server 3. The result of the authentication is transmitted from the surrogate authentication server 2 to the service server 3.

Depending on the result of the authentication sent from the surrogate authentication server 2, the service server 3 provides its service to the CE device 1.

The CE device manufacturer 4 stores predetermined information in the CE devices 1 it manufactures. The same information is also sent over the network 5 to the surrogate authentication server 2. The CE device manufacturer 4 may not be necessarily connected to the network 5; the CE device manufacturer 4 need only be arranged suitably to receive the information for device authentication.

In the description that follows, the network 5 is assumed to intervene whenever the process of transmitting or receiving information takes place even though the network 5 is not explicitly referred to.

Figure 2:
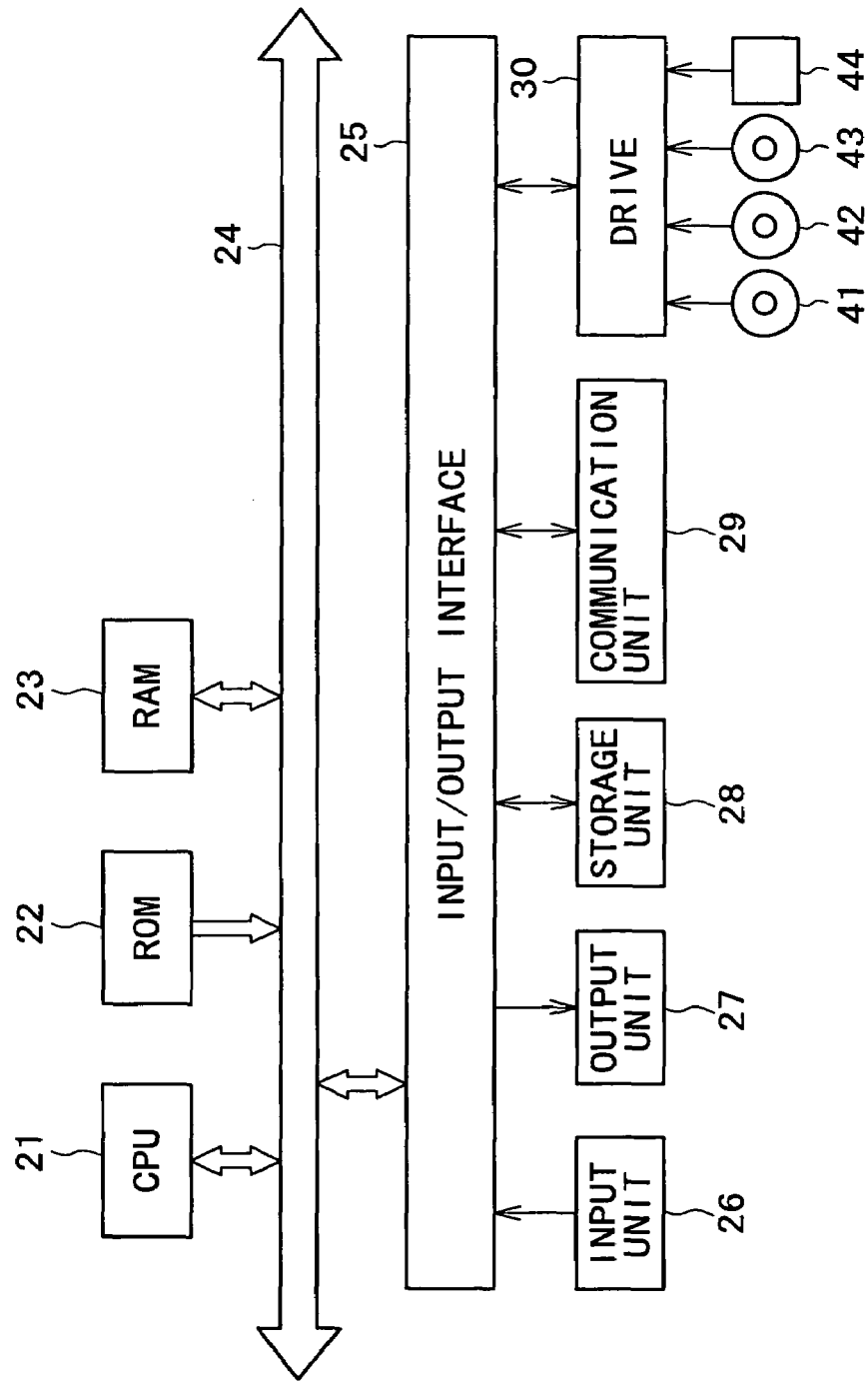
FIG. 2 is a block diagram depicting a typical structure of a CE device shown in FIG. 1.

FIG. 2 is a block diagram depicting a typical structure of the CE device 1.

A CPU 21 performs various processes based on programs held in a ROM 22 or in accordance with programs loaded from a storage unit 28 into a RAM 23. The RAM 23 may also accommodate data as needed for the CPU 21 to execute its processes.

The CPU 21, ROM 22, and RAM 23 are interconnected via a bus 24. The bus 24 in turn connects with an input/output interface 25.

The input/output interface 25 is connected to an input unit 26, an output unit 27, the storage unit 28, and a communication unit 29. The input unit 26 comprises illustratively a keyboard and a mouse. The output unit 27 is made up of a display such as a CRT (cathode ray tube) or an LCD (liquid crystal display) and speakers. The storage unit 28 is formed by a hard disc drive or the like. The communication unit 29, constituted by a modem, a terminal adapter, etc., performs communication processing over the network including the Internet 15.

A drive 30 is connected as needed to the input/output interface 25. The drive 30 is loaded illustratively with a magnetic disc 41, an optical disc 42, a magneto-optical disc 43, or a memory card 44. The computer programs read from the loaded storage medium are installed as needed into the storage unit 28.

The surrogate authentication server 2 and the service server 3 basically have the same structure as the CE device 1 and thus their structures will not be discussed or illustrated further.

A process performed during manufacture of the CE device 1 will now be described with reference to the flowchart of FIG. 3.

In step S11, the surrogate authentication server 2 generates a device ID of the CE device 1 and a random number (called the pass phrase hereunder) that cannot be deciphered by the user. In step S12, the surrogate authentication server 2 generates and stores a challenge public key and a challenge private key.

In step S13, the surrogate authentication server 2 transmits the device ID, pass phrase, and challenge public key to the CE device manufacturer 4. How the challenge public key and challenge private key are used will be discussed later.

In step S1, the CE device manufacturer 4 receives the device ID, pass phrase, and challenge public key from the surrogate authentication server 2. In step S2, the CE device manufacturer 4 generates a device customer registration code based on the device ID.

The device customer registration code is generated as shown in the flowchart of FIG. 4. It is assumed that the device ID is formed by a four-digit sequence.

In step S31, the sum of the digits in the device ID is divided by 9, and the remainder from the division is inserted between the second and the third digits in the device ID.

For example, if the device ID is "1234," then the sum "10" of the four digits "1234" is divided by 9, which gives a remainder of "1." The remainder is inserted between the second digit "2" and the third digit "3," whereby a sequence of "12134" is generated.

In step S32, the first and the fifth digits are switched within the sequence generated in step S31.

For example, the first digit "1" and the fifth digit "4" in the sequence "12134" are switched, which gives a sequence of "42131."

In step S33, the sum of the digits in the sequence generated in step S32 is multiplied by 2, and the first digit of the product is inserted between the fourth and the fifth digits in the sequence generated in step S32. The resulting sequence is used as the device customer registration code.

Illustratively, the sum "11" of the digits within the sequence "42131" is multiplied by 2. The first digit "2" of the product "22" is inserted between the fourth digit "3" and the fifth digit "1" in the sequence "42131," whereby a device customer registration code of "421321" is generated.

When the device customer registration code is generated in the manner described above, the process of device customer registration code generation turns serial device IDs such as "1234," "1235," "1236" and "1237" not into serial numbers but into discrete codes like "421321," "522361," "522341" and "623381," as shown in FIG. 5. As a result, a user having purchased a CE device 1 furnished with its device customer registration code cannot guess the device customer registration code attached to any other CE device having been shipped. (In other words, no user of the CE device can impersonate another user.)

The above-described method for generating device customer registration codes is but one example of the code generation. Any other suitable method may be adopted to generate device customer registration codes.

How the device customer registration code is utilized will be described later.

In step S3 back in FIG. 3, the CE device manufacturer 4 manufactures the CE device 1 including the storage unit 28 in which the device ID, pass phrase, and challenge public key received in step S1 are stored. Furthermore, the CE device manufacturer 4 prints illustratively onto a sticker the device customer registration code generated in step S2, and packs the CE device 1 together with the sticker for shipment.

In step S4, the CE device manufacturer 4 generates a database called a device registration master 4A in which the information associated with the CE device 1 (called the device information) such as the device ID, pass phrase, device manufacturer's name, device type, and date of manufacturer are stored.

In step S5, the CE device manufacturer 4 transmits the device registration master 4A generated in step S4 to the surrogate authentication server 2 over the network 5. In step S13, the surrogate authentication server 2 places into storage the device registration master 4A of the CE device 1 sent from the CE device manufacturer 4.

When transmitting the device registration master 4A to the surrogate authentication server 2, the CE device manufacturer 4 encrypts the master using appropriate means. Encryption is adopted here to prevent an unscrupulous third party from illegally acquiring the device registration master 4A. All information exchanged among the CE device 1, surrogate authentication server 2, and the service server 3 is also to be encrypted using suitable arrangements.

In step S6, the CE devices 1 thus manufactured start being marketed. Illustratively, the CE devices 1 are sold by mail over the network 5 and purchased by users 11.

Figure 6:
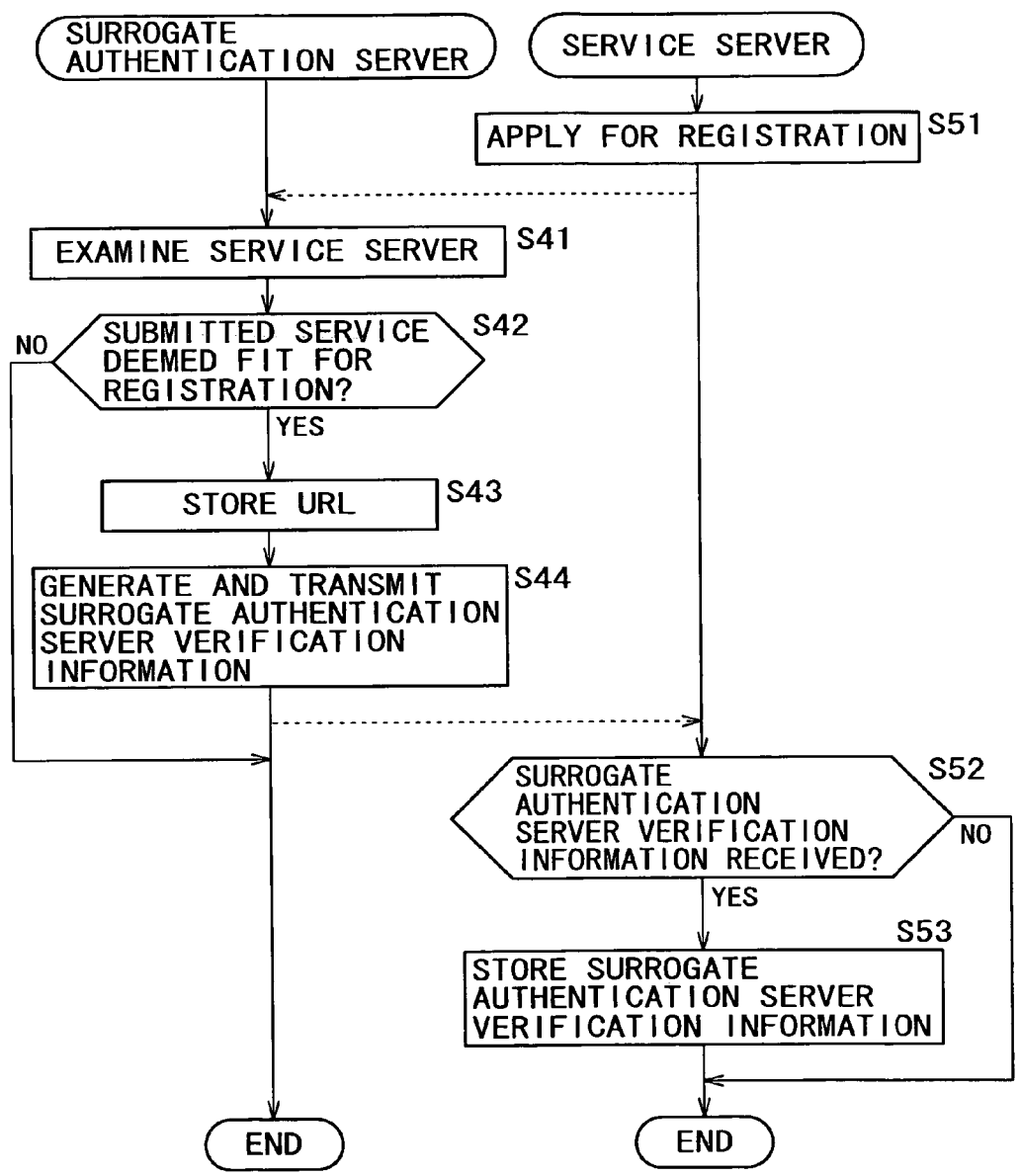
FIG. 6 is a flowchart of steps constituting the process of registering a service server shown in FIG. 1 with a surrogate authentication server.

Described below with reference to the flowchart of FIG. 6 is the process in which the service server 3 has its service offerings registered with the surrogate authentication server 2 so that the latter server 2 may take over the authentication process on behalf of the service server 3.

In step S51, the service server 3 applies to the surrogate authentication server 2 for registration of a specific service for which the eligibility of a user is to be authenticated by the surrogate authentication server 2 on behalf of the service server 3.

In step S41, the surrogate authentication server 2 examines the service server 3. In step S42, the surrogate authentication server 2 proceeds to determine whether the submitted service is fit for registration based on the result of the examination.

In step S42, a check is made to see whether the submitted service is fit for registration. If the submitted service is deemed adequate, then the surrogate authentication server 2 goes to step S43 and stores a URL and other information about a website that offers the service (i.e., the website run by the service server 3). In step S44, the surrogate authentication server 2 generates surrogate authentication server verification information, i.e., information describing a URL and other information about the website to be accessed by the CE device 1 for verifying whether the surrogate authentication server 2 is a legitimate server. The generated information is transmitted from the surrogate authentication server 2 to the service server 3.

In step S52, the service server 3 determines whether the surrogate authentication server verification information is received. If the information is found to be received, step S53 is reached. In step S53, the service server 3 puts the received surrogate authentication server verification information into storage.

If in step S42 the surrogate authentication server 2 determines that the submitted service is not fit for registration, then steps S43 and S44 are skipped and the process is terminated. In this case, no information for surrogate authentication server verification is transmitted to the service server 3.

If in step S52 the service server 3 does not receive the surrogate authentication server verification information (i.e., if steps S43 and S44 are skipped by the surrogate authentication server 2), the process is brought to an end.

Figure 7:
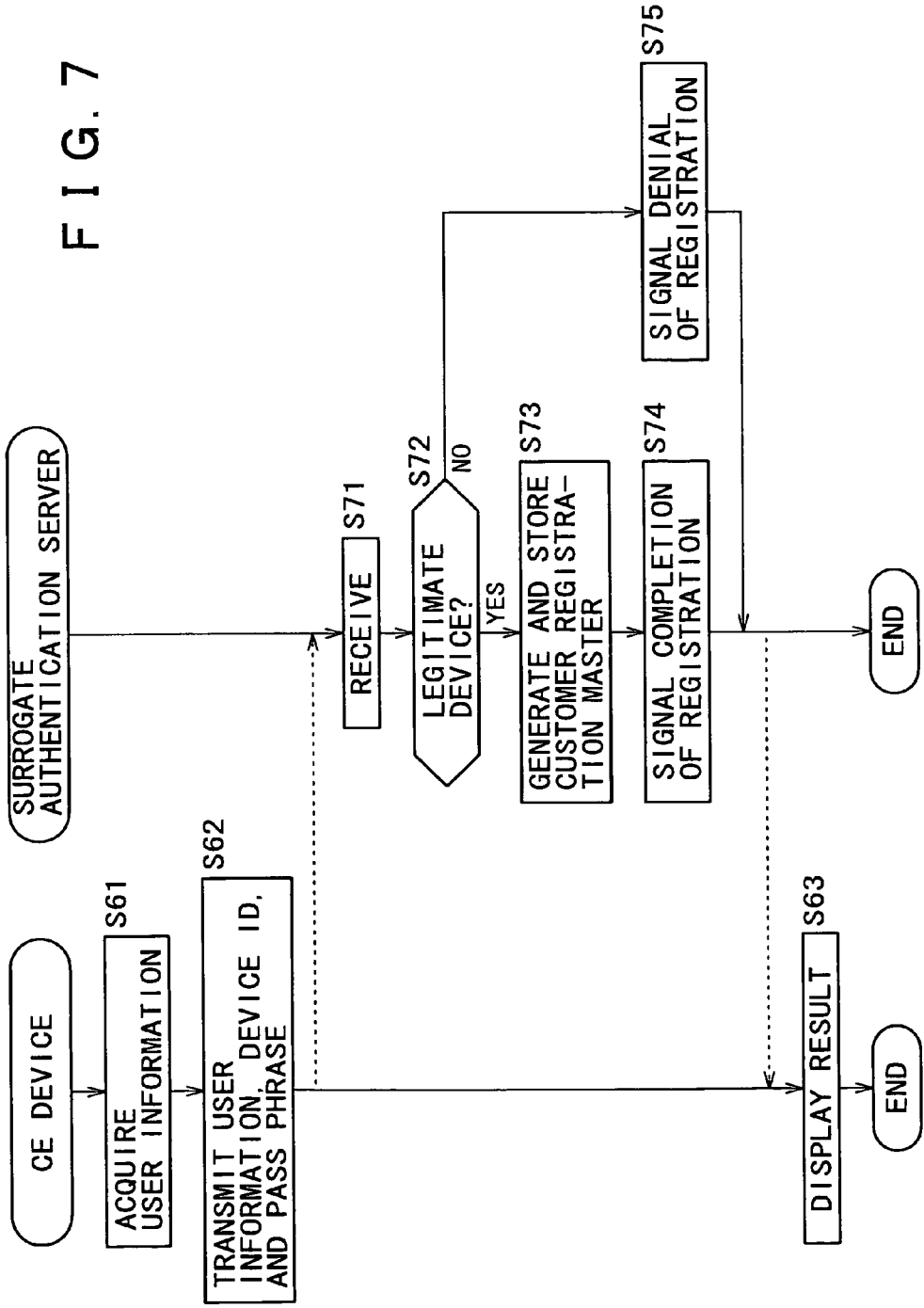
FIG. 7 is a flowchart of steps constituting the process of registering the CE device in FIG. 1 with the surrogate authentication server.

Described below with reference to the flowchart of FIG. 7 is the process of registering the CE device 1 with the surrogate authentication server 2 as a device eligible for a registered service following surrogate authentication (i.e., as a device capable of being proved by the surrogate authentication server 2 on behalf of the service server 3, to be eligible for the service registered with the server 2 in the process of FIG. 6).

In step S61, the user 11 who purchased the CE device 1 starts up a device registration application (e.g., a browser or an application program dedicated to CE device registration). The CE device 1 then acquires user information.

More specifically, as shown in FIG. 8, the CE device 1 causes the output unit 27 to display an input screen through which the user is prompted to input user-related information (called the user information for authentication) such as his or her name, address, telephone number, postal code, date of birth, sex, credit card name, credit card number, and credit card expiration date. In the example of FIG. 8, the CE device 1 has its own device ID (stored in step S3 of FIG. 3) displayed on the input screen.

After inputting the user information for authentication to the input screen of FIG. 8, the user 11 operates a verification (OK) button 27A to get the input information displayed as shown in FIG. 9 for confirmation. Then operating a registration (ENTER) button 27B on the screen allows the CE device 1 to acquire the information input to the screen of FIG. 8 as the user information for authentication from the user 11.

In step S62, the CE device 1 gains access to the website run by the surrogate authentication server 2 for CE device registration. Through the website, the CE device 1 transmits to the surrogate authentication server 2 the user information for authentication acquired in step S61 together with the device ID and pass phrase held in the storage unit 28.

In step S71, the surrogate authentication server 2 receives the user information for authentication, device ID, and pass phrase from the CE device 1. In step S72, the surrogate authentication server 2 determines whether there exists the device registration master 4A (stored in step S14 of FIG. 3) in which the received device ID and pass phrase are stored, in order to find out if the CE device 1 in question is a legally shipped device (legitimate device).

If in step S72 the CE device 1 is found to be a legitimate device (i.e., if there exists the device registration master 4A in which the device ID and pass phrase received in step S71 are found), then step S73 is reached. In step S73, the surrogate authentication server 2 registers the user information for authentication received in step S71 in association with the device ID found in the device registration master 4A, so as to generate and store a customer registration master 2A about the user 11. The device and customer registration masters make it possible for the surrogate authentication server 2 to search not only for device information but also for user information for authentication on the basis of a given device ID.

In step S74, the surrogate authentication server 2 signals to the CE device 1 that the registration has been completed.

If in step S72 the CE device 1 is not found to be a legitimate device, then step S75 is reached in which the surrogate authentication server 2 signals denial of registration to the CE device 1.

In step S63, the CE device 1 is notified by the surrogate authentication server 2 that the registration has been completed or has failed, and gives a message display reflecting the received notice. FIG. 10 shows a typical message displayed by the CE device 1 when the registration has been completed.

Figure 11:
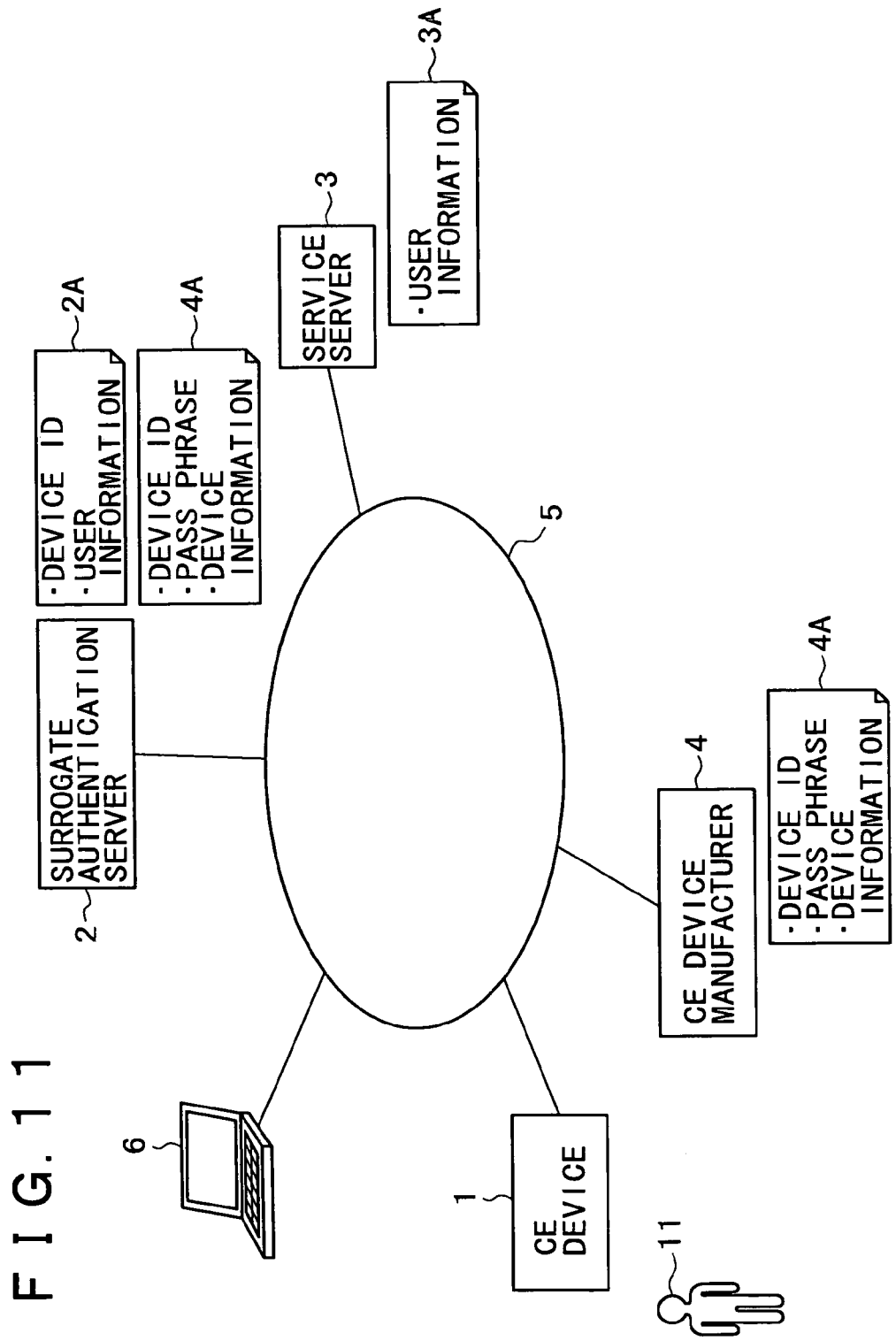
FIG. 11 is a schematic view showing another typical configuration of the service providing system embodying this invention.
Figure 12:
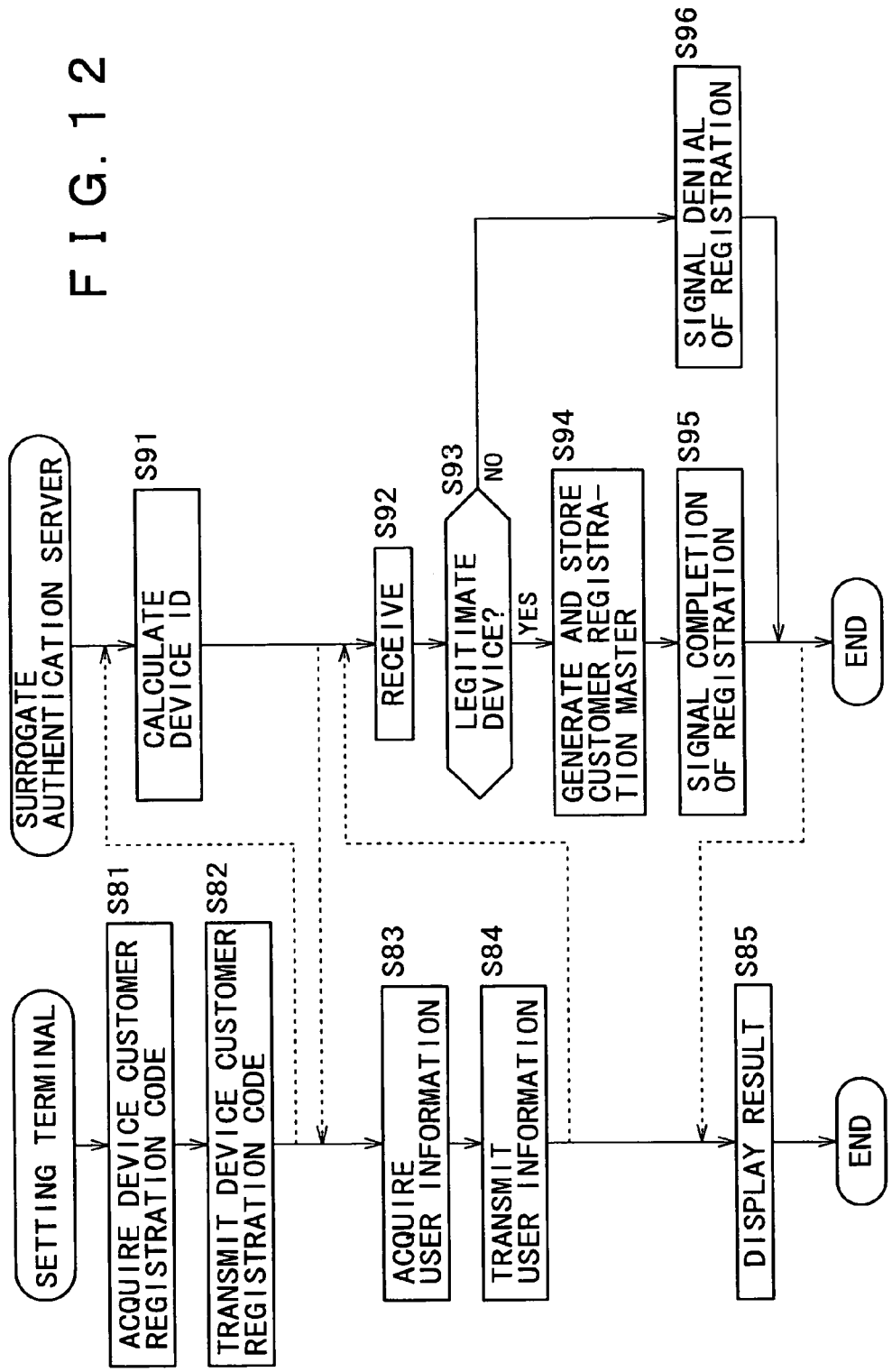
FIG. 12 is a flowchart of steps constituting the process of registering the CE device with the surrogate authentication server by use of a setting terminal shown in FIG. 11.

It might happen that the input unit 26 or output unit 27 of the CE device 1 is so minimal that it is difficult to input the user information for authentication or other data through the device. In that case, it is still possible to register the CE device 1 with the surrogate authentication server 2 by utilizing a setting terminal 6 such as a personal computer having adequate input and output capabilities, as shown in FIG. 11. Described below with reference to the flowchart of FIG. 12 is how the setting terminal 6 is used to register the CE device 1 with the surrogate authentication server 2.

In step S81, the user 11 starts up a registration application (e.g., a browser or an application program dedicated to CE device registration) on the setting terminal 6. The setting terminal 6 then acquires a device customer registration code.

Figure 13:
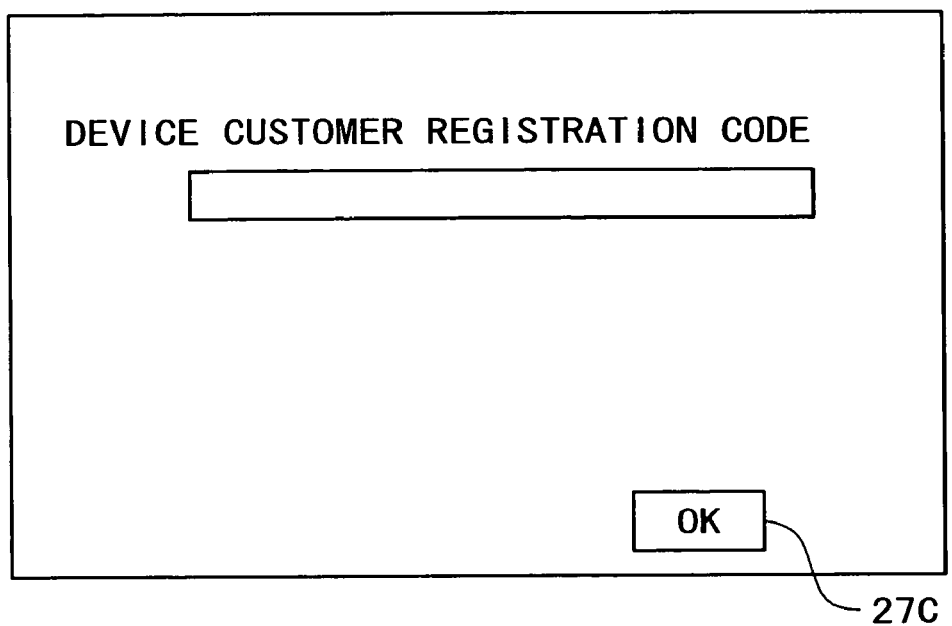
FIG. 13 is a schematic view of a device customer registration code input screen on display.

More specifically, as illustrated in FIG. 13, the setting terminal 6 causes the output unit 27 to display an input screen through which the user is prompted to input his or her device customer registration code.

The user 11 inputs his or her device customer registration code to an input screen, and operates an OK button 27C on the screen as shown in FIG. 13. This a causes the setting terminal 6 to acquire the data that have been input to the screen as the device customer registration code.

In step S82, the setting terminal 6 gains access to the website run by the surrogate authentication server 2 for CE device registration. Through the website, the setting terminal 6 transmits to the surrogate authentication server 2 the device customer registration code acquired in step S81.

In step S83, the setting terminal 6 acquires the user information in the same manner as in step S61 of FIG. 7. In step S84, the setting terminal 6 again accesses the website run by the surrogate authentication server 2 for CE device registration and transmits the user information obtained in step S83 to the server 2 through the website.

In step S91, the surrogate authentication server 2 (to be more precise, the website run by the surrogate authentication server 2 for CE device registration) calculates the device ID based on the device customer registration code sent from the setting terminal 6, by reversing the order in which the device customer registration code was calculated from the device ID as shown in the flowchart of FIG. 4.

For example, if the device customer registration code is "421321," the fifth digit "2" is first removed from the code. Within the resulting value "42131," the first digit "4" and the fifth digit "1" are switched. The switching of the digits gives the sequence "12134" from which the third digit "1" is removed. This provides the original device ID "1234."

In step S92, the surrogate authentication server 2 receives the user information from the CE device 1. In step S93, the surrogate authentication server 2 determines whether there exists the device registration master 4A in which the device ID calculated in step S91 is stored, in order to find out if the CE device 1 in question is a legally shipped device (legitimate device).

In steps 94 through S96, the surrogate authentication server 2 (to be more precise, the website run by the surrogate authentication server 2 for CE device registration) performs the same process as in steps S73 through S76 of FIG. 7. The description of the steps is redundant and thus will not be repeated.

In step S85, the CE device 1 is notified by the surrogate authentication server 2 that the registration has been completed or has failed, and gives a message display reflecting the received notice.

It might happen that the device customer registration code is input incorrectly (in step S81) in a manner not described here causing an improbable sequence of digits to be calculated as a device ID (in step S91). In that case, the CE device will not be registered. If any incorrect device ID were directly input to represent the device customer registration code, the CE device 1 would have the resulting sequence registered erroneously as its device ID. Instead, when the device customer registration code is first input so that the device ID is calculated in a predetermined manner there from, it is possible to prevent an inappropriate sequence of digits from getting registered as a device ID wrongly identifying the CE device 1.

Described below with reference to the flowchart of FIG. 14 is how the CE device 1 receives the service offering from the service server 3. When the user 11 operates the input unit 26 to give instructions for receiving a specific service from the service server 3, the CE device 1 goes to step S101 where it gains access to the service server 3 and requests the service from that server 3.

When requested by the CE device 1 to provide the service, the service server 3 reaches step S121 and proceeds to verify whether a session is established with the CE device 1. In step S122, a check is made to see if the session is established on the basis of the verification in step S121.

If in step S122 the service server 3 determines that the session is not established with the CE device 1, step S123 is reached. In step S123, the service server 3 transmits to the CE device 1 the surrogate authentication server verification information stored earlier in step S53 of FIG. 6.

The surrogate authentication server verification information includes URLs of websites that may be accessed in order to verify whether the surrogate authentication server 2 is a legitimate server. If the application program run on the CE device 1 for utilizing the service is a customized HTML browser, then the surrogate authentication server verification information is turned into an HTML file. The URLs of the websites are then given as HTML tags as shown in FIG. 15, or are embedded in an HTTP response header as indicated in FIG. 16.

In step S102, the CE device 1 determines whether the surrogate authentication server verification information is received from the service server 3. If the verification information is found to be received, step S103 is reached. In step S103, the CE device 1 carries out the process of verifying whether the surrogate authentication server 2 is a legitimate server based on the received surrogate authentication server verification information. The process of step S103 will be discussed later in more detail.

In step S104, the CE device 1 determines whether the surrogate authentication server 2 is a legitimate server on the basis of the verification in step S103. If the surrogate authentication server 2 is found to be a legitimate server, then step S105 is reached.

In step S105, the CE device 1 transmits to the surrogate authentication server 2 the device ID and pass phrase stored into the storage unit 28 in step S3 of FIG. 3, as well as the URL of the website at which the service sever 3 provides its service, whereby surrogate authentication is requested. (To be more precise, the information is sent to the website having a URL 3A-2 or 3B-2 in the surrogate authentication server verification information (shown in FIG. 15 or 16), the websites being run by the surrogate authentication server 2.)

In step S141, the surrogate authentication server 2 performs the process corresponding to that which is carried out by the CE device 1 (in step S103) verifying whether the surrogate authentication server 2 is a legitimate server. In step S142, the surrogate authentication server 2 determines whether surrogate authentication is requested from the CE device 1.

If in step S142 the surrogate authentication server 2 determines that surrogate authentication is requested from the CE device 1, step S143 is reached. In step S143, the surrogate authentication server 2 determines whether the service requested by the CE device 1 is registered as one of the services about which the server 2 is authorized to carry out surrogate authentication. More specifically, the surrogate authentication server 2 retains the URLs of the services registered in step S43 of FIG. 6. Upon receipt of a URL from the CE device 1, the surrogate authentication server 2 determines whether the URL matches one of those in storage representing the registered services.

If in step S143 the service requested by the CE device 1 is found to be registered, then step S144 is reached. In step S144, the surrogate authentication server 2 authenticates the CE device 1 by determining whether there exists the device registration master 4A in which the device ID and pass phrase received in step S142 are found. In step S145, the surrogate authentication server 2 transmits the result of the authentication from step S144 to the service server 3.

In step S124, the service server 3 determines whether the result of the authentication about the CE device 1 is received from the surrogate authentication server 2. If the result of the authentication is found to be received, step S125 is reached.

In step S125, the service server 3 finds out whether the result of the authentication proves the CE device 1 eligible for service offerings from the service server 3. If the CE device 1 is found to be eligible, step S126 is reached.

In step S126, the service server 3 determines whether the CE device 1 is registered with the service server 3 as a device eligible for its service. If the CE device 1 is not found registered, step S127 is reached.

In step S127, the service server 3 carries out the process of CE device registration. This process will be discussed later in more detail.

If in step S126 the CE device 1 is found to be registered, or if in step S127 the CE device 1 has been registered, then step S128 is reached. In step S128, the service server 3 establishes the session with the CE device 1.

If in step S122 the session is found to be established, or if in step S128 the session has been established, then step S129 is reached. In step S129, the service server 3 provides the CE device 1 with the requested service in accordance with the user information about the user 11 stored in a customer registration master 3A that is retained by the service server 3. The customer registration master 3A will be described later.

While the session established in step S128 with the CE device 1 is being in effect, the surrogate authentication server 2 is not requested in principle to authenticate the CE device 1 (because the affirmative result of step S122 allows the service server 3 to skip steps S123 through S128). This alleviates the burdens on the surrogate authentication server 2.

More specifically, if the server information is to be referenced every five minutes with device authentication carried out every time, that will burden the surrogate authentication server 2 with excess loads. Instead, the burdens on the surrogate authentication server are alleviated by having the service server 3 maintain the session, with the device authentication process performed, say, twice a day only.

In step S106, the CE device 1 performs the process corresponding to that which is carried out by the service server 3 registering the CE device 1 (in step S127). In step S107, the CE device 1 determines whether the service is provided by the service server 3. If the service is found to be provided, the CE device 1 reaches step S108 and uses the provided service.

The CE device 1 brings the process to an end in one of the following cases: if in step S102 the surrogate authentication server verification information is not found to be received (i.e., if the result of step S122 performed by the service server 3 is affirmative); if in step S104 the surrogate authentication server 2 is not found to be a legitimate server; if in step S107 the service is not found to be provided by the service server 3

(i.e., if the result of step S124 or S125 carried out by the service server 3 is negative); or if in step S108 the service is used by the CE device 1.

The service server 3 terminates the process if in step S124 the service server 3 determines that the result of the authentication is not received (i.e., if the result of step S142 or S143 executed by the surrogate authentication server 2 is negative), or if in step S125 the CE device 1 is not found eligible for the service from the service server 3.

The surrogate authentication server 2 puts an end to the process if in step S142 surrogate authentication is not found to be requested (i.e., if the result of step S104 performed by the CE device 1 is negative), or if in step S143 the service is not found to be registered.

As described above, when the CE device 1 is to receive the service from the service server 3, security-critical information such as the device ID is sent not to the service server 3 but to the surrogate authentication server 2 (in step S105). The service server 3 then receives only the result of the authentication about the CE device 1 from the surrogate authentication server 2 (in step S145). These steps allow the CE device 1 to receive services with increased security.

Because the result of the authentication about the CE device 1 is transmitted only to the service server 3 registered beforehand with the surrogate authentication server 2 (in steps S143 through S145), security is enhanced further.

Before the CE device 1 requests surrogate authentication (in step S105), the surrogate authentication server 2 to which to submit the request is authenticated. This makes sure that sensitive information such as the device ID is sent only to a legitimate server so that a still higher level of security is ensured.

The CE device 1 is authenticated by the surrogate authentication server 2. That means there is no need for the service server 3 to prepare or procure schemes for authenticating the service-requesting CE device 1. As a result, the service server 3 can be structured more simply than before.

Authentication of the CE device 1 is practically started by the service server 3 when the latter transmits the surrogate authentication server verification information to the CE device 1. In other words, the surrogate authentication server verification information serves as authentication request information. The service server 3 may control the start of authentication of the CE device 1 by adjustably determining when to transmit the surrogate authentication server verification information depending on the processing loads involved in offering the service.

Figure 17:
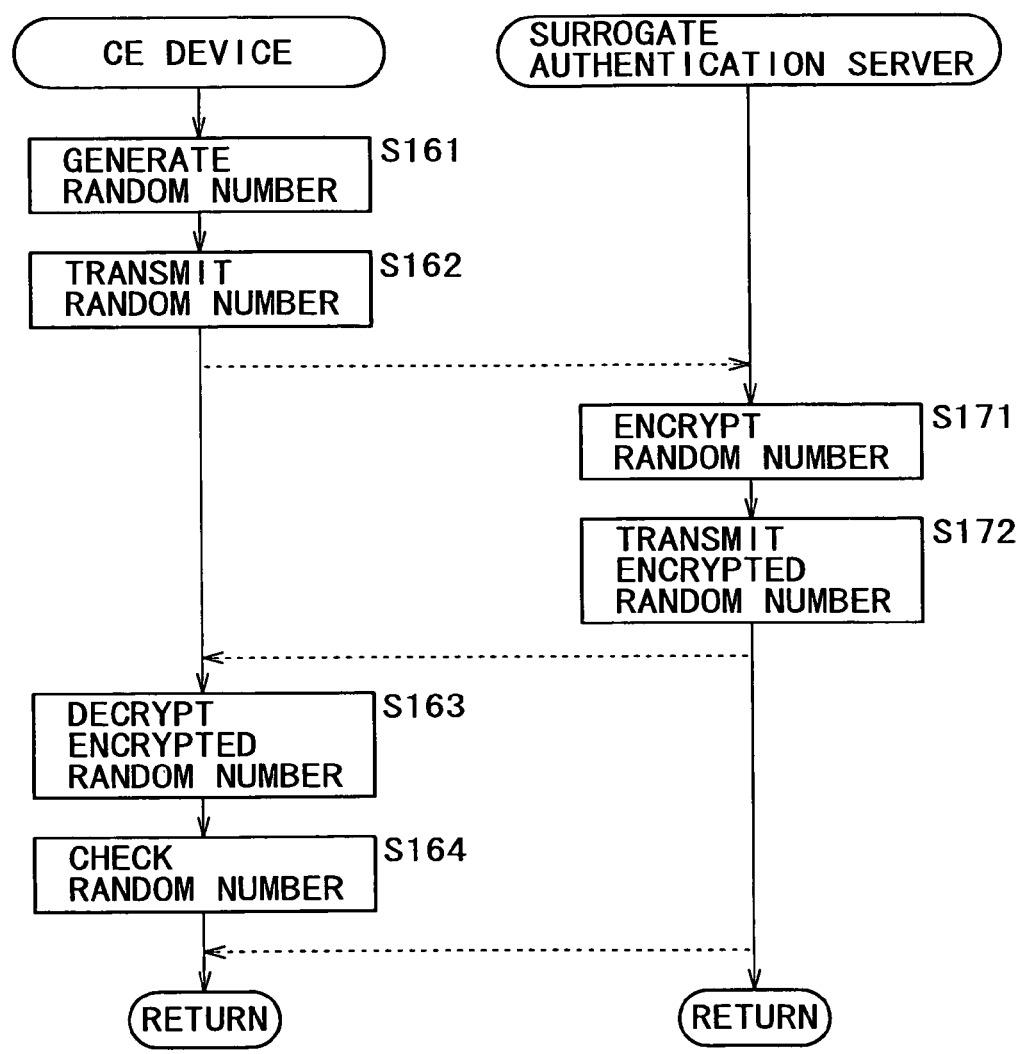
FIG. 17 is a flowchart of steps detailing a process performed in steps S103 and S141 of FIG. 14.

What follows is a more detailed description, with reference to the flowchart of FIG. 17, of the surrogate authentication server verification process performed by the CE device 1 in step S103 and by the surrogate authentication server 2 in step S141.

In step S161, the CE device 1 generates a random number (which may also be called a challenge hereunder). In step S162, the CE device 1 transmits the random number (challenge) generated in step S161 to the surrogate authentication server 2 (To be more precise, the random number is sent to the website having a URL 3A-1 or 3B-1 in the surrogate authentication server verification information shown in FIG. 15 or 16, the websites being run by the surrogate authentication server 2.).

In step S171, the surrogate authentication server 2 (to be more precise, the website having the URL 3A-1 or 3B-1 in the surrogate authentication server verification information shown in FIG. 15 or 16, the website being run by the surrogate authentication server 2) encrypts the random number (challenge) from the CE device 1 using the challenge private key generated in step S11 of FIG. 3. In step S172, the surrogate authentication server 2 transmits the encrypted random number to the CE device 1.

In step S163, the CE device 1 decrypts the encrypted random number (challenge) sent from the surrogate authentication server 2, using the challenge public key placed into the storage unit 28 in step S3 of FIG. 3.

In step S164, the CE device 1 checks the challenge generated in step S161 against the challenge obtained through decryption in step S163. From step S164, control is passed on to step S104 of FIG. 14 in which the CE device 1 determines whether the surrogate authentication server 2 is a legitimate server on the basis of the check in step S164. That is, if the check in step S164 proves that the challenge generated in step S161 matches the challenge acquired through decryption in step S163, then the surrogate authentication server 2 is considered a legitimate server and step S105 is reached. In case of a mismatch in step S164, the surrogate authentication server 2 is not regarded as legitimate and the process is brought to and end.

Figure 18:
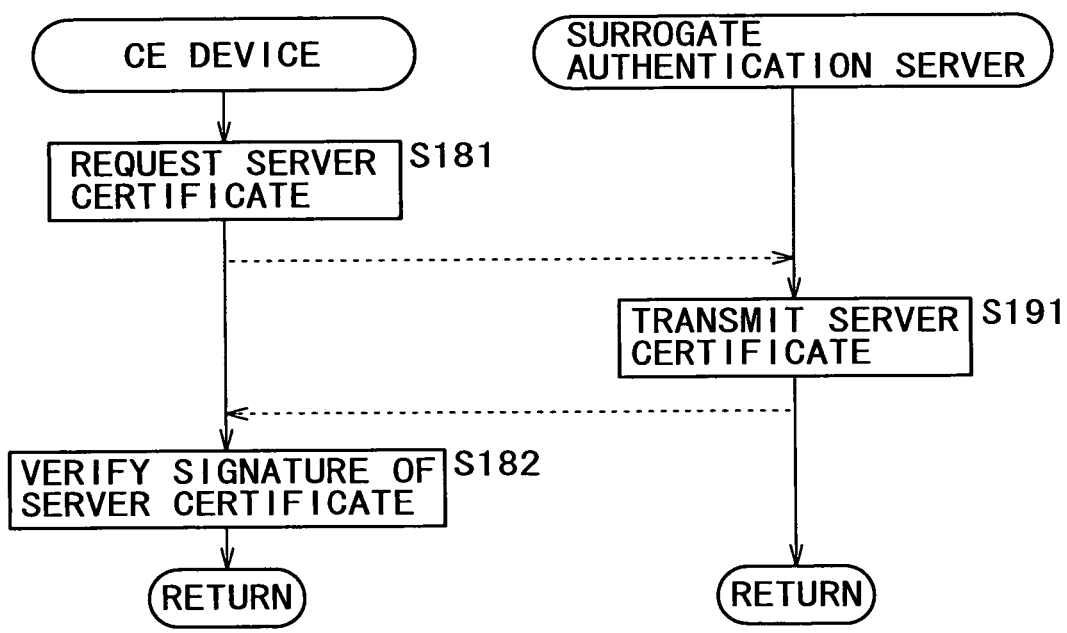
FIG. 18 is a flowchart of steps detailing another process performed in steps S103 and S141 of FIG. 14.

In the example of FIG. 17, the surrogate authentication server 2 is shown verified using the challenge generated by the CE device 1. Alternatively, a server certificate may be used to verify the surrogate authentication server 2. Described below with reference to the flowchart of FIG. 18 is how the surrogate authentication server verification process is carried out by the CE device 1 in step S103 of FIG. 14 and by the surrogate authentication server 2 in step S141 through the use of a server certificate.

In step S181, the CE device 1 requests the surrogate authentication server 2 to furnish its server certificate.

In step S191, the surrogate authentication server 2 transmits the server certificate to the CE device 1.

In step S182, the CE device 1 verifies the signature of the server certificate sent from the surrogate authentication server 2. Illustratively, the CE device 1 decrypts the server certificate using a device ID public key, and checks the decrypted information against the device ID held in the storage unit 28.

From step S182, control is passed on to step S104 of FIG. 14 in which the CE device 1 determines whether the surrogate authentication server 2 is a legitimate server on the basis of the verification in step S182. Illustratively, if the information acquired by decrypting the server certificate is found to match the device ID, the surrogate authentication server 2 is considered a legitimate server and step S105 is reached. In case of a mismatch, the surrogate authentication server 2 is not regarded as legitimate and the process is terminated.

Figure 19:
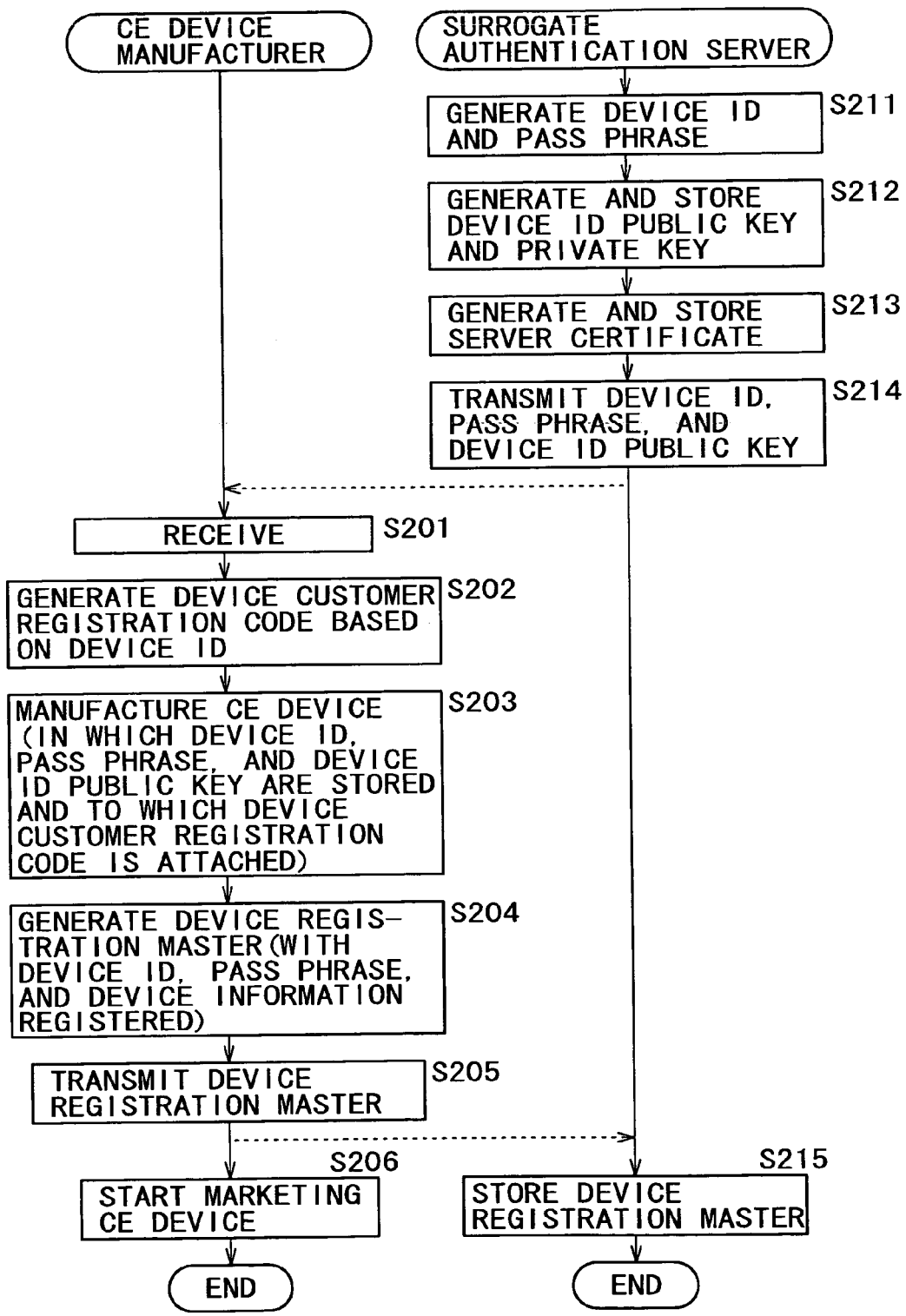
FIG. 19 is a flowchart of steps constituting another process carried out during manufacture of the CE device.

The server certificate and the device ID public key are generated in a particular process during manufacture of the CE device 1 shown in FIG. 19. This is a process that replaces the corresponding process outlined earlier in FIG. 3.

In step S211 of FIG. 19, the surrogate authentication server 2 generates a device ID and a pass phrase for the CE device 1. In step S212, the surrogate authentication server 2 generates a device ID public key and a device ID private key and puts them in storage.

In step S213, the surrogate authentication server 2 generates a server certificate by encrypting the device ID generated in step S211 through the use of the device ID private key generated in step S212. The server 2 stores the generated server certificate.

In step S214, the surrogate authentication server 2 transmits to the CE device manufacturer 4 the device ID generated in step S211 as well as the device ID public key generated in step S212.

In step S201, the CE device manufacturer 4 receives the device ID and device ID public key sent from the surrogate authentication server 2.

In step S202, the CE device manufacturer 4 generates a device customer registration code based on the device ID, as shown in the flowchart of FIG. 4.

In step S203, the CE device manufacturer 4 manufactures the CE device 1 including the storage unit 28 in which the device ID, pass phrase, and device ID public key received in step S201 are stored. Furthermore, the CE device manufacturer 4 prints illustratively onto a sticker the device customer registration code generated in step S202, and packs the CE device 1 together with the sticker for shipment.

In step S204, the CE device manufacturer 4 generates a database called the device registration master 4A in which the device ID, pass phrase, and device information are stored.

In step S205, the CE device manufacturer 4 transmits the device registration master 4A generated in step S204 to the surrogate authentication server 2. In step S215, the surrogate authentication server 2 places into storage the device registration master 4A of the CE device 1 sent from the CE device manufacturer 4.

In step S206, the CE devices 1 thus manufactured start being marketed.

In step S144 of FIG. 14 above, the CE device 1 was authenticated using the device ID and pass phrase. Alternatively, a device certificate for authentication of the CE device 1 may be used to authenticate the CE device 1. In this case, in step S105 of FIG. 14, the CE device 1 transmits the device certificate for authentication to the surrogate authentication server 2 together with the URL of the website at which the service server 3 offers its service.

In step S144, the surrogate authentication server 2 decrypts the device certificate sent from the CE device 1, and checks the decrypted information against the device ID of the CE device 1.

Figure 20:
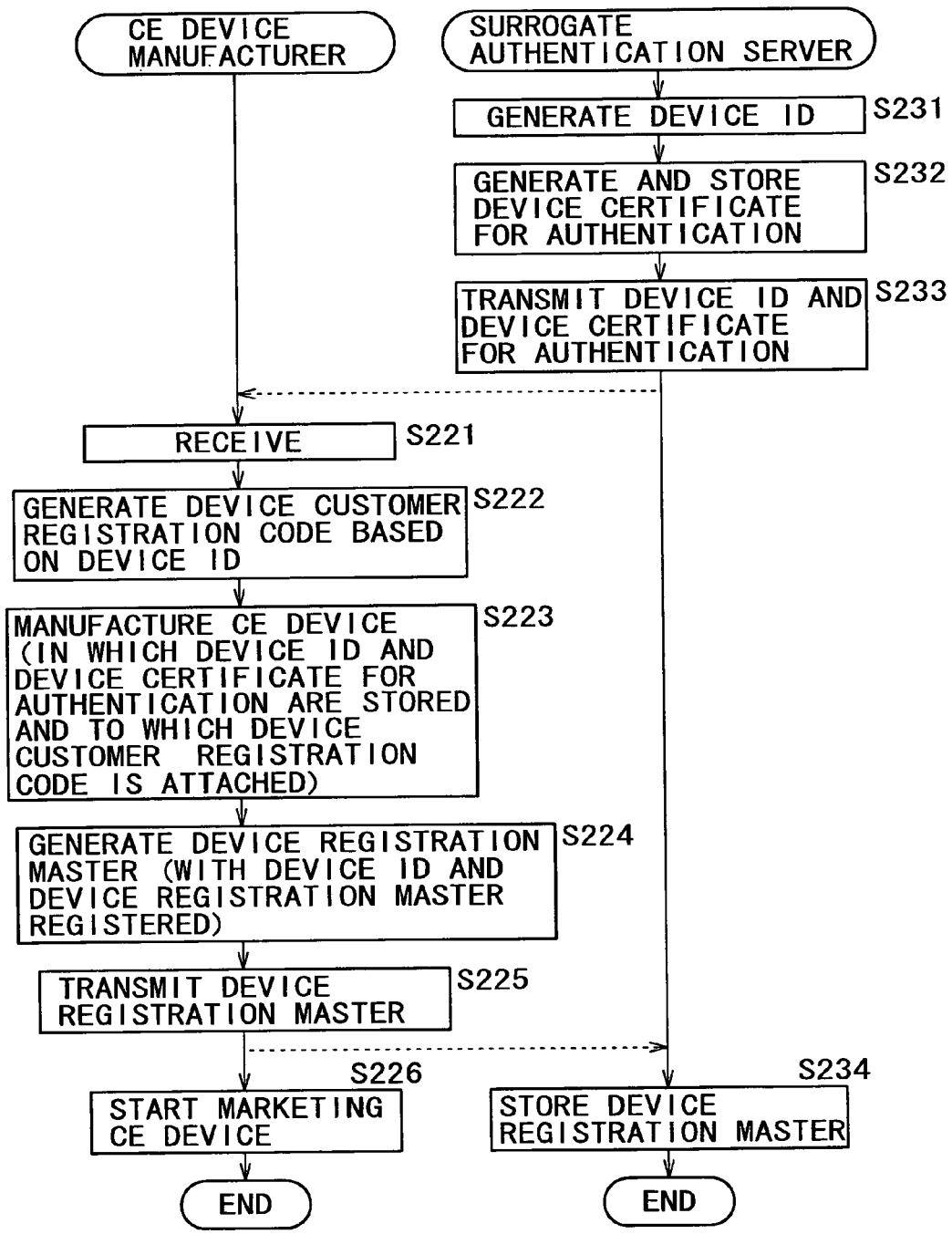
FIG. 20 is a flowchart of steps constituting another process executed during manufacture of the CE device.

The device certificate for authentication is generated in a specific process during manufacture of the CE device 1 shown in FIG. 20. This is a process that replaces the corresponding process shown in FIG. 3.

In step S231, the surrogate authentication server 2 generates a device ID for the CE device 1.

In step S232, the surrogate authentication server 2 generates a device certificate for authentication by encrypting the device ID generated in step S231, and places the generated certificate in storage.

In step S233, the surrogate authentication server 2 transmits to the CE device manufacturer 4 the device ID generated in step S231 as well as the device certificate for authentication generated in step S232.

In step S221, the CE device manufacturer 4 receives the device ID and device certificate for authentication sent from the surrogate authentication server 2.

In step S222, the CE device manufacturer 4 generates a device customer registration code based on the device ID, as shown in the flowchart of FIG. 4.

In step S223, the CE device manufacturer 4 manufactures the CE device 1 including the storage unit 28 in which the device ID and device certificate for authentication received in step S221 are stored. Furthermore, the CE device manufacturer 4 prints illustratively onto a sticker the device customer registration code generated in step S222, and packs the CE device 1 together with the sticker for shipment.

In step S224, the CE device manufacturer 4 generates a database called the device registration master 4A in which the device ID and device information are stored.

The process in steps S225 and S226 is the same as the process in step S205 and S206 of FIG. 19, and the process in step S234 is the same as that in step S215 of FIG. 19. The description of these processes is thus redundant and will not be repeated here.

Figure 21:
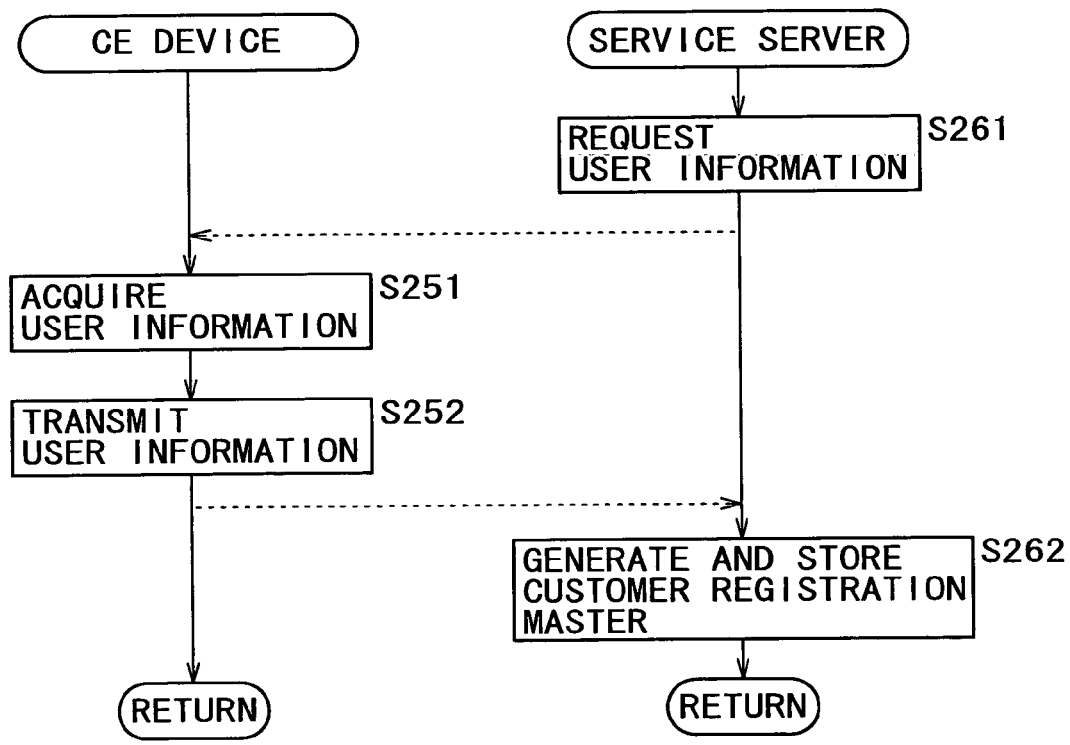
FIG. 21 is a flowchart of steps detailing a process performed in steps S106 and S127 of FIG. 14.

What follows is a more detailed description, with reference to the flowchart of FIG. 21, of the process of registering the CE device 1 with the service server 3 as carried out by the CE device 1 in step S106 and by the service server 3 in step S127.

In step S261, the service server 3 requests the CE device 1 to furnish user information for service registration purposes.

In step S251, the CE device 1 acquires the user information for service registration.

More specifically, as illustrated in FIG. 22, the CE device 1 causes the output unit 27 to display an input screen through which the user is prompted to input his or her user information for service registration, such as the user name, address, and telephone number. In the example of FIG. 22, the CE device 1 has its own device ID displayed on the input screen.

After inputting the user information to the input screen of FIG. 22, the user 11 operates a verification (OK) button 27D to get the input information displayed as shown in FIG. 23 for confirmation. Then operating a registration (ENTER) button 27E on the screen allows the CE device 1 to acquire the information input to the screen of FIG. 22 as the user information for service registration from the user 11.

In step S252, the CE device 1 gains access to the website run by the service server 3 for CE device registration. Through the website, the CE device 1 transmits the user information acquired in step S251 to the service server 3. The CE device 1 then goes to step S107 of FIG. 14.

In step S262, the service server 3 (to be more precise, the website run by the service server 3 for CE device registration) registers the user information sent from the CE device 1, whereby the customer registration master 3A for the user 11 is generated and stored. From step S262, the service server 3 goes to step S128 of FIG. 14.

In the example of FIG. 14, the service server 3 is verified by the surrogate authentication server 2 (in step S143). This allows security to be maintained when device IDs and other sensitive information about CE devices 1 are sent to the service server 3. When supplied illustratively with a CE device ID, the service server 3 may generate a customer registration master 3A in association with that device ID.

Figure 24:
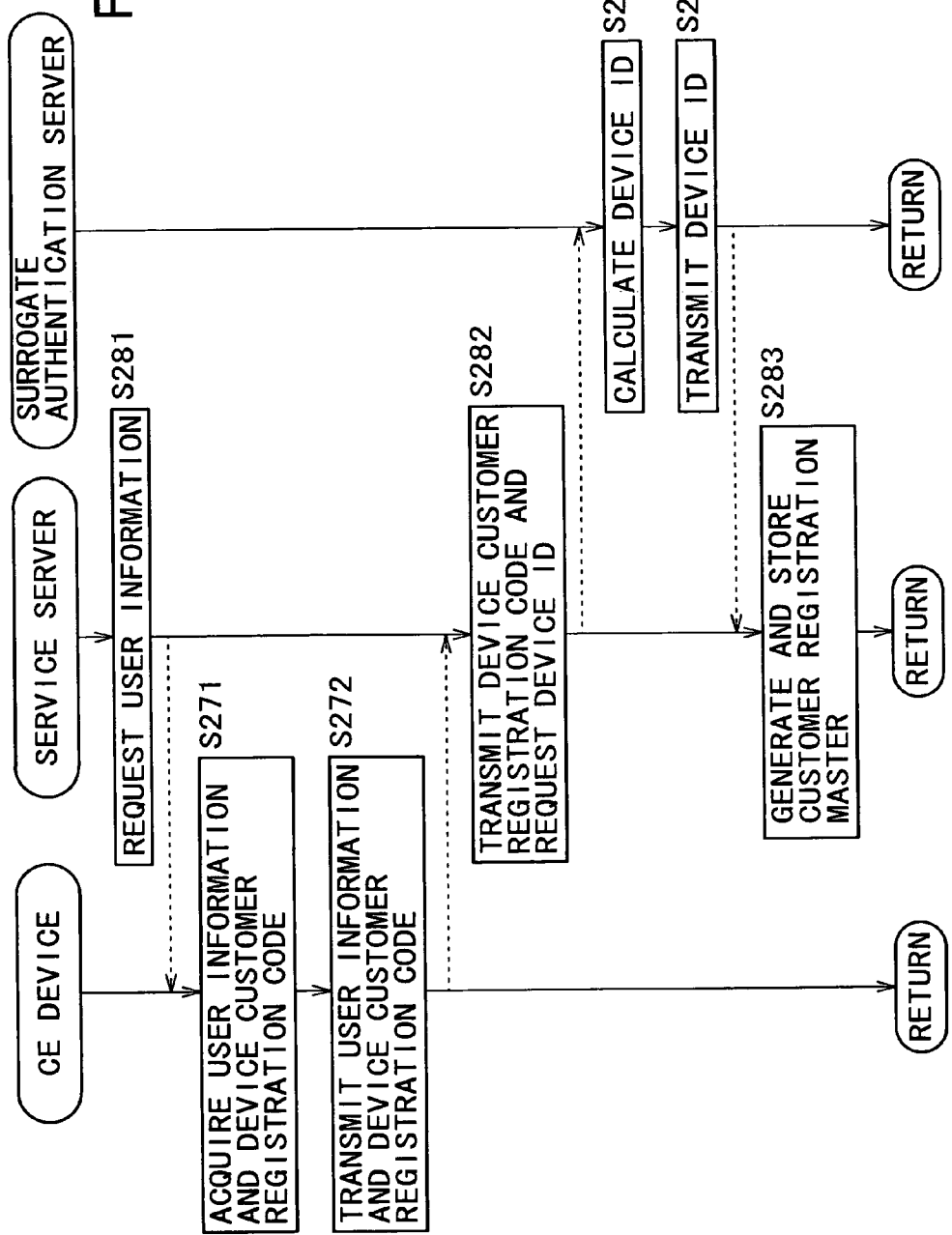
FIG. 24 is a flowchart of steps detailing another process performed in steps S106 and S127 of FIG. 14.

Described below with reference to the flowchart of FIG. 24 is how the customer registration master 3A is generated in association with the device ID, the master generation being part of the process performed by the CE device 1 in step S106 of FIG. 14 and by the service server 3 in step S127.

In step S281, the service server 3 requests user information for service registration from the CE device 1.

In step S271, the CE device 1 displays an input screen such as one shown in FIG. 13 through which the user is prompted to input his or her device customer registration code. When the device customer registration code is input and acquired, the CE device 1 displays another input screen through which the user is prompted to input his or her user information for service registration. The input user information is also acquired by the CE device 1.

In step S272, the CE device 1 gains access to the website run by the service server 3 for CE device registration. Through the accessed website, the CE device 1 transmits the user information and device customer registration code acquired in step S271 to the service server 3.

In step S282, the service server 3 transmits to the surrogate authentication server 2 the device customer registration code sent from the CE device 1, and requests the surrogate authentication server 2 to furnish the device ID of the CE device 1.

In step S291, the surrogate authentication server 2 calculates the device ID based on the device customer registration code sent from the service server 3. In step S292, the surrogate authentication server 2 transmits the calculated device ID to the service server 3.

In step S283, the service server 3 generates the customer registration master 3A about the user 11 by registering the user information from the CE device 1 in association with the device ID from the surrogate authentication server 2. The service server 3 retains the generated customer registration master 3A. The service server 3 can search through the retained customer registration master 3A for the relevant user information based on a given device ID.

In the example of FIG. 14, the service server 3 provides the CE device 1 with the requested service in accordance with the registered user information in the customer registration master 3A about the user 11 retained by the service server 3, as shown in FIG. 25A. Alternatively, the service server 3 may acquire the customer registration master 2A and device registration master 4A from the surrogate authentication server 2 and provide the service according to the acquired masters, as depicted in FIG. 25B. That is, the service server 3 may provide user-oriented services based on the user information as shown in FIG. 26A, as well as device-oriented services in accordance with the device type as indicated in FIG. 26B.

Figure 27:
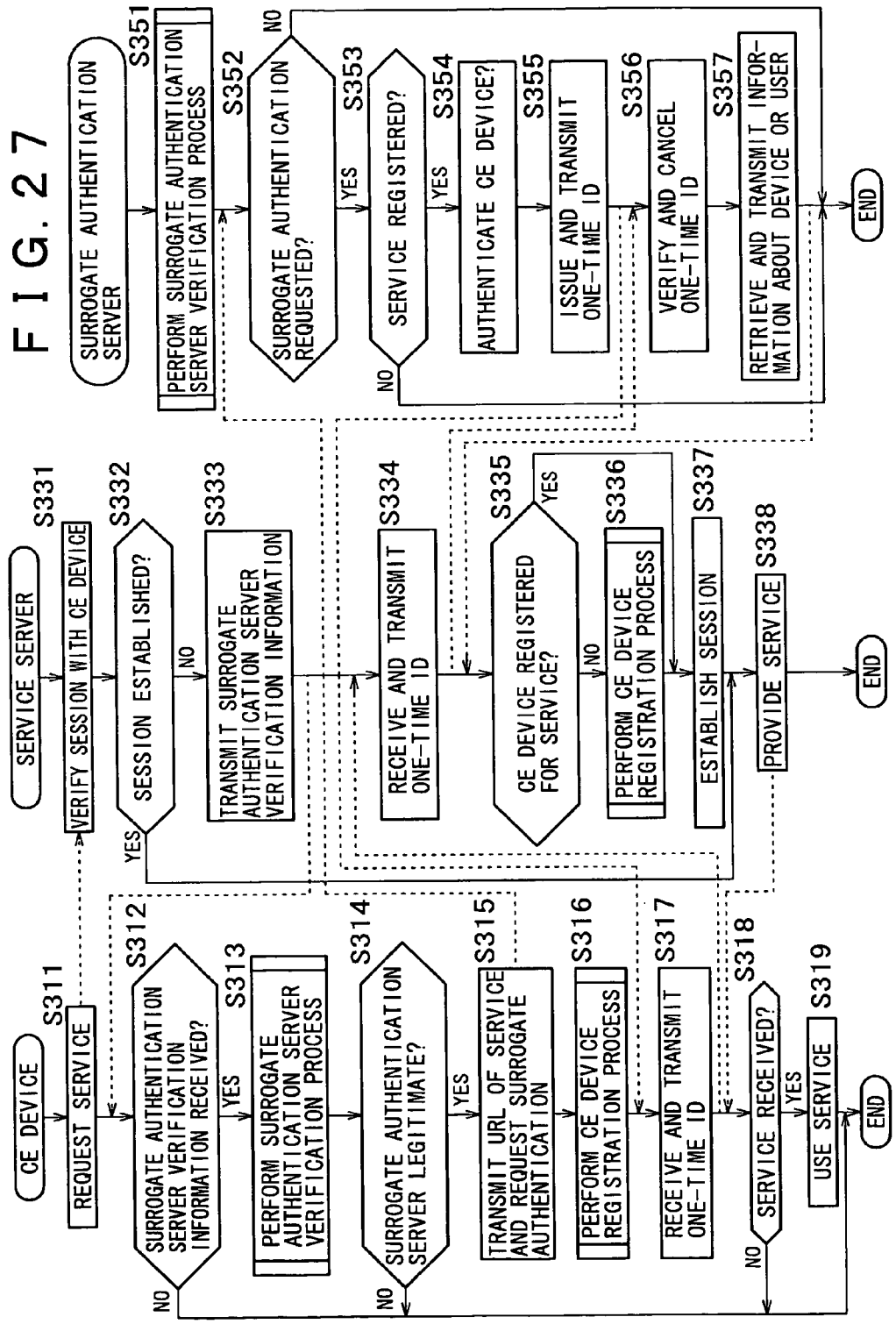
FIG. 27 is a flowchart of other steps in which the CE device in FIG. 1 receives the service from the service server.

Described below with reference to the flowchart of FIG. 27 is how the service server 3 provides its service by acquiring the registered information from the surrogate authentication server 2.

The process performed by the CE device 1 in steps S311 through S316 is the same as the process effected in steps S101 through S106 of FIG. 14. The process carried out by the service server 3 in steps S331 through S333 is the same as the process executed in steps S121 through S123 of FIG. 14. The process conducted by the surrogate authentication server 2 in steps S351 through S354 is the same as the process performed in steps S141 through S144 of FIG. 14. The description of these processes is redundant and thus will not be repeated.

In step S354, the surrogate authentication server 2 authenticates the CE device 1. In step S355, the surrogate authentication server 2 issues a one-time ID which identifies the authenticated CE device 1 and which is transmitted to that CE device 1. The one-time ID will be canceled later in step S356.

In step S317, the CE device 1 receives the one-time ID from the surrogate authentication server 2, and transmits the received one-time ID to the service server 3.

In step S334, the service server 3 receives the one-time ID from the CE device 1. By transmitting the received one-time ID to the surrogate authentication server 2, the service server 3 requests the information about the CE device 1 or about the user 11 from the surrogate authentication server 2.

In step S356, the surrogate authentication server 2 verifies whether the one-time ID transmitted from the service server 3 is the same as that sent from the server represented by the URL received in step S352. If the result of the verification is positive, the surrogate authentication server 2 cancels the one-time ID.

In step S357, the surrogate authentication server 2 searches through the device registration master 4A or the customer registration master 2A for the information about the CE device 1 identified by the one-time ID canceled in step S356, or for the information about the user 11 of that CE device 1, the information being registered with the surrogate authentication server 2. The retrieved information is transmitted from the surrogate authentication server 2 to the service server 3.

The process performed by the service server 3 in steps S335 through S337 is the same as the process carried out in steps S126 through S128 of FIG. 14. The description of these processes is redundant and thus will not be repeated. In step S338, the service server 3 may provide the CE device 1 with the requested service in a manner based not only on the information registered with the service server 3 but also on the information sent from the surrogate authentication server 2. For example, if the device information is sent from the surrogate authentication server 2, the service server 3 may provide the service to the CE device 1 in accordance with the device manufacturer name, device type, and/or the date of manufacture of the device included in the transmitted device information.

The process carried out by the CE device 1 in steps S318 and S319 is the same as the process performed in steps S107 and S108 of FIG. 14. The description of these processes is redundant and thus will not be repeated.

Once utilized, the one-time ID is canceled as described above. That means any one-time ID acquired fraudulently by an unscrupulous party does not allow the party to obtain the information about the CE device 1 registered with the surrogate authentication server 2. This promises a still higher level of security than ever before.

The surrogate authentication server 2 retains the information about the services with which the CE device 1 is registered. When that information is sent from the surrogate authentication server 2 to the service server 3 (in step S357), the service server 3 may determine, based on the information, whether the CE device 1 in question is registered with the service server 3 (in step S335).

In the example of FIG. 14, once a session is established with the CE device 1 by the service server 3 in step S128 of FIG. 14, that session is managed by the service server 3. Alternatively, the session between the CE device 1 and the service server 3 may be managed by the surrogate authentication server 2 as shown in the flowchart of FIG. 28.

In step S371, the CE device 1 determines whether the session with the service server 3 is assigned a valid session ID which has been furnished by the surrogate authentication server 2 by way of the service server 3. The session ID will be stored by the CE device 1 in step S378 as will be described later.

More specifically, the session ID includes information denoting a time limit beyond which the service server 3 will not offer its service to the CE device 1. The CE device 1 thus checks to see whether the valid time period designated by the session ID has expired If in step S371 the session ID is found to be valid, step S372 is reached. In step S372, the CE device 1 requests the desired service from the service server 3 by transmitting the session ID to the service server 3.

In step S391, the service server 3 receives the session ID and the service request from the CE device 1. In step S392, the service server 3 determines whether the session ID is valid.

If in step S392 the session ID is found to be valid, the service server 3 goes to step S393.

The process performed by the service server 3 in steps S393 through S400 is the same as the process carried out in steps S121 through S128 of FIG. 14. The process executed by the CE device 1 in steps S373 through S377 is the same as the process conducted in steps S102 through S106 of FIG. 14. The process effected by the surrogate authentication server 2 in steps S411 through S415 is the same as the process performed in steps S141 through S145 of FIG. 14. The description of these processes is redundant and thus will not be repeated.

In step S400, the service server 3 establishes the session with the CE device 1. In step S401, the service server 3 performs the process of acquiring, storing, and transmitting the session ID in conjunction with the process of storing the session ID by the CE device 1 in step S378 and with the process of issuing the session ID by the surrogate authentication server 2 in step S416. These processes carried out by the CE device 1, surrogate authentication server 2, and service server 3 are described below in detail with reference to the flowchart of FIG. 29.

In step S431, the service server 3 requests the session ID from the surrogate authentication server 2.

In step S441, the surrogate authentication server 2 issues the session ID to be assigned to the session between the service server 3 and the CE device 1. In step S442, the surrogate authentication server 2 transmits the issued session ID to the service server 3.

In step S432, the service server 3 stores the session ID sent from the surrogate authentication server 2 as the session ID identifying the current session with the CE device 1. In step S433, the service server 3 transmits the session ID to the CE device 1.

In step S421, the CE device 1 stores the session ID sent from the service server 3.

After transmitting the session ID to the CE device 1 in step S433, the service server 3 goes to step S402 of FIG. 28. In step S402, the service server 3 transmits the requested service to the CE device 1.

After storing the session ID in step S421 of FIG. 29, the CE device 1 goes to step S379 of FIG. 28. In step S379, the CE device 1 determines whether the service is received from the service server 3. When the service is found to be received, the CE device 1 reaches step S380 and proceeds to use the received service.

After transmitting the session ID to the service server 3 in step S442 of FIG. 29, the surrogate authentication server 2 returns to FIG. 28 and terminates the process.

If in step S371 of FIG. 28 the session ID is not found to be valid, the CE device 1 goes to step S376. In step S376, the CE device 1 requests surrogate authentication from the surrogate authentication server 2 by transmitting to the server 2 the device ID, pass phrase, and the URL of the service server 3 from which to receive the service. In this case, a session is reestablished between the service server 3 and the CE device 1 (in step S400), and a session ID to be assigned to that session is issued by the surrogate authentication server 2 (in step S416).

If in step S392 the session ID is not found to be valid, the service server 3 brings the process to an end.

As described, the CE device 1 and the service server 3 are arranged to determine the validity of the session ID issued by the surrogate authentication server 2, the session ID specifying the time limit beyond which the service server 3 will not provide its service to the CE device 1. The surrogate authentication server 2 allows the service to be received and provided depending on the result of the check on the session ID. In this manner, the surrogate authentication server 2 manages the provision of services by the service server 3 to the CE device 1.

INDUSTRIAL APPLICABILITY

According to the invention, device users can receive services from a service providing apparatus without having to submit their sensitive authentication information to that apparatus.

The invention claimed is:

1. A service providing system comprising:
a terminal unit for requesting and using a service;
a service providing apparatus for providing said service; and
an authentication apparatus, being distinct from and in communication with said service providing apparatus, for authenticating said terminal unit as a legitimate terminal unit to receive said service, for examining said service providing apparatus upon application by said service providing apparatus for registration of said service, and for determining whether said service is fit for registration as a service to be provided based on a result of said examination of said service providing apparatus,
wherein,
said terminal unit includes:
a first transmitting unit for transmitting authentication information to said authentication apparatus, and
a usage unit for using said service provided by said service providing apparatus, said authentication apparatus includes:
an authenticating unit for authenticating said terminal unit based on said authentication information transmitted from said first transmitting unit of said terminal unit, and
a second transmitting unit for transmitting a result of the authentication performed by said authenticating unit to said service providing apparatus, and said service providing apparatus includes:
a providing unit for providing said service directly to said terminal unit depending on said result of said authentication transmitted from said second transmitting unit of said authentication apparatus.

2. A service providing system according to claim 1, wherein
said service providing apparatus includes third transmitting unit for transmitting authentication request information to said terminal; and
said first transmitting unit of said terminal unit transmits said authentication information to said authentication apparatus when said authentication request information is transmitted from said third transmitting unit of said service providing apparatus.

3. A service providing system according to claim 2, wherein said authentication request information includes a URL of a website run by said authentication apparatus for purposes of said authentication.

4. A service providing system according to claim 1, wherein,
said first transmitting means of said terminal unit transmits first identification information for identifying said service providing apparatus to said authentication apparatus together with said authentication information;
said authentication apparatus includes a verifying unit for verifying whether said service providing apparatus identified by said first identification information is legitimate; and
said second transmitting unit transmits said result of said authentication to said service providing apparatus in accordance with a result of the verification performed by said verifying unit.

5. A service providing system according to claim 1, wherein said authentication apparatus includes:
a registering unit for registering information about said terminal unit; and
first issuing unit which, if said terminal unit is authenticated by said authenticating unit as a legitimate terminal unit to receive said service, then issues second identification information for temporarily identifying said terminal unit;

said service providing apparatus includes:
- an acquiring unit which, based on said second identification information, acquires said information about said terminal unit registered by said registering unit of said authentication apparatus; and
- based on said result of said authentication, said providing unit provides said service to said terminal unit in accordance with said information about said terminal unit acquired by said acquiring unit.

6. A service providing system according to claim 5, wherein said first issuing unit of said authentication apparatus cancels said second identification information when said information about said terminal unit is acquired by said acquiring unit of said service providing apparatus.

7. A service providing system according to claim 1, wherein,
- said authentication apparatus includes second issuing unit for issuing permission information for permitting said service providing apparatus to provide said service to said terminal unit; and
- if the issued permission information permits said service providing apparatus to provide said service to said terminal unit, then said providing unit of said service providing apparatus provides said service to said terminal unit based on said result of said authentication.

8. A service providing system comprising:
a terminal unit for requesting and using a service;
a service providing apparatus for providing the service, and
an authentication apparatus distinct from and in communication with said service providing apparatus for authenticating said terminal unit;
wherein,
said terminal unit includes:
- an authentication information transmitting unit for transmitting authentication information to said authentication apparatus; and
- a first authentication result transmitting unit for receiving a result of the authentication from said authentication apparatus and transmitting said result of said authentication to said service providing apparatus, said authentication apparatus includes:
- an authenticating unit for performing said authentication based on said authentication information transmitted from said authentication information transmitting unit of said terminal unit;
- an examination unit for examining said service providing apparatus upon application by said service providing apparatus for registration of said service;
- a determination unit for determining whether said service is fit for registration as a service to be provided directly to said terminal unit based on a result of said examination of said service providing apparatus; and
- a second authentication result transmitting unit for transmitting to said terminal unit said result of said authentication performed by said authenticating unit, and said service providing apparatus includes:
- a third authentication result transmitting unit for transmitting said result of said authentication to said authentication apparatus depending on said result of said authentication transmitted from said first authentication result transmitting unit of said terminal unit.

9. A service providing method for use with a service providing system comprising a terminal unit for requesting and using a service, a service providing apparatus for providing the service, and an authentication apparatus distinct from and in communication with said service providing apparatus for authenticating said terminal unit, said service providing method comprising the steps of:

transmitting authentication information from said terminal unit to said authentication apparatus;

authenticating said authentication information at said authentication apparatus;

examining said service providing apparatus upon application by said service providing apparatus for registration of said service;

determining whether said service is fit for registration as a service to be provided directly to said terminal unit based on a result of said examination of said service providing apparatus;

transmitting a result of the authentication of said authentication information to said terminal unit;

transmitting said result of said authentication to said service providing apparatus;

transmitting said result of said authentication from said service providing apparatus to said authentication apparatus;

verifying whether said result of said authentication transmitted from said service providing apparatus is the same as said result of said authentication transmitted to said terminal unit; and providing a result of the verification to said service providing apparatus.

10. A service providing system comprising:
a terminal unit for requesting and using a service,
a service providing apparatus for providing said service, and
an authentication apparatus, distinct from and in communication with said service providing apparatus, for authenticating said terminal unit as a legitimate terminal unit to receive said service,
wherein,
said terminal unit includes:
- a service requesting unit for requesting said service from said service providing apparatus;
- an authentication information transmitting unit for transmitting authentication information to said authentication apparatus;
- an authentication result receiving unit for receiving a result of the authentication from said authentication apparatus;
- a first authentication result transmitting unit for transmitting said result of said authentication to said service providing apparatus; and
- a usage unit for using said service provided by said service providing apparatus, said authentication apparatus includes:
- an authentication information authenticating unit for authenticating said terminal unit based on said authentication information transmitted from said authentication information transmitting unit of said terminal unit;
- an examination unit for examining said service providing apparatus upon application by said service providing apparatus for registration of said service;
- a determination unit for determining whether said service is fit for registration as a service to be provided based on a result of said examination of said service providing apparatus;

a second authentication result transmitting unit for transmitting a result of the authentication performed by said authentication information authenticating unit to said terminal unit; and an authentication result authenticating unit for authenticating said result of said authentication transmitted from said service providing apparatus, and said service providing apparatus includes:

a providing unit for providing said service directly to said terminal unit after transmitting to said authentication apparatus said result of said authentication transmitted from said first authentication result transmitting unit of said terminal unit.

11. A service providing method for use with a service providing system comprising a terminal unit for requesting and using a service, a service providing apparatus for providing said service, and an authentication apparatus, distinct from and in communication said service providing apparatus, for authenticating said terminal unit as a legitimate terminal unit to receive said service, said service providing method comprising the steps of:

requesting said service of said service providing apparatus from said terminal unit;

transmitting authentication information from said terminal unit to said authentication apparatus;

authenticating said authentication information at said authentication apparatus;

examining said service providing apparatus upon application by said service providing apparatus for registration of said service;

determining whether said service is fit for registration as a service to be provided based on a result of said examination of said service providing apparatus;

transmitting a result of the authentication of said authentication information from said authentication apparatus to said terminal unit;

transmitting said result of said authentication from said terminal unit to said service providing apparatus;

transmitting said result of said authentication from said service providing apparatus to said authentication apparatus;

verifying said result of said authentication transmitted from said service providing apparatus is the same as said result of said authentication transmitted to said terminal unit at said authentication apparatus;

transmitting a result of the verification of said result of said authentication from said authentication apparatus to said service providing apparatus; and providing the requested service from said service providing apparatus directly to said terminal unit based on said result of said verification.

* * * * *